US011226841B2

(12) United States Patent
Tokuyama et al.

(10) Patent No.: US 11,226,841 B2
(45) Date of Patent: Jan. 18, 2022

(54) INFORMATION PROCESSING SYSTEM, INFORMATION PROCESSING DEVICE, AND INFORMATION PROCESSING METHOD

(71) Applicant: MITSUBISHI ELECTRIC CORPORATION, Tokyo (JP)

(72) Inventors: Satoru Tokuyama, Tokyo (JP); Jun Yukawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 527 days.

(21) Appl. No.: 16/071,419

(22) PCT Filed: Aug. 23, 2016

(86) PCT No.: PCT/JP2016/074482
§ 371 (c)(1),
(2) Date: Jul. 19, 2018

(87) PCT Pub. No.: WO2017/163447
PCT Pub. Date: Sep. 28, 2017

(65) Prior Publication Data
US 2020/0334074 A1 Oct. 22, 2020

(30) Foreign Application Priority Data
Mar. 22, 2016 (JP) .............................. JP2016-056437

(51) Int. Cl.
*G06F 9/46* (2006.01)
*G06F 9/48* (2006.01)
(Continued)

(52) U.S. Cl.
CPC .......... *G06F 9/4881* (2013.01); *G06F 9/3836* (2013.01); *G06F 9/5066* (2013.01); *H04L 67/02* (2013.01)

(58) Field of Classification Search
CPC .... G06F 9/4881; G06F 9/3836; G06F 9/5066; G06F 9/3877; G06F 9/3879;
(Continued)

(56) References Cited

U.S. PATENT DOCUMENTS

2004/0153708 A1    8/2004    Joshi et al.
2005/0188087 A1    8/2005    Iyoda
(Continued)

FOREIGN PATENT DOCUMENTS

JP    2005-528691 A    9/2005
JP    2005-352915 A    12/2005
(Continued)

OTHER PUBLICATIONS

Extended European Search Report issued in corresponding European Application No. 16895472.5 dated Mar. 6, 2019.

*Primary Examiner* — Emerson C Puente
*Assistant Examiner* — Zhi Chen
(74) *Attorney, Agent, or Firm* — Birch, Stewart, Kolasch & Birch, LLP

(57) ABSTRACT

An information processing device provided with: an application division setting part for assigning execution responsibility for each of a plurality of execution files included in an application to one of a plurality of information processing devices, and for generating execution responsibility assignment information indicating each of the execution files and an information processing device to which the execution responsibility for the execution file is assigned; a communication part for transmitting the execution responsibility assignment information to a network; and an application division execution part for referring to the execution responsibility assignment information to execute an execution file whose execution responsibility is assigned to its own device out of the plurality of execution files.

7 Claims, 29 Drawing Sheets

(51) Int. Cl.
*G06F 9/38* (2018.01)
*G06F 9/50* (2006.01)
*H04L 29/08* (2006.01)

(58) Field of Classification Search
CPC ..... G06F 9/3881; G06F 9/3885; H04L 67/02; H04L 67/10; H04L 67/1002; H04L 67/1004; H04L 67/1008; H04L 67/1012; H04L 67/1023; H04L 67/1021; H04L 67/1025; H04L 67/1029; H04L 67/1031; H04L 67/1034
See application file for complete search history.

(56) References Cited

U.S. PATENT DOCUMENTS

| | | | | |
|---|---|---|---|---|
| 2007/0110094 A1* | 5/2007 | Tobita | .................. | G06F 9/4887 370/453 |
| 2008/0069117 A1* | 3/2008 | Murata | ................. | H04L 67/101 370/396 |
| 2010/0131740 A1 | 5/2010 | Yokote et al. | | |
| 2010/0161978 A1* | 6/2010 | Bacher | ................... | G06F 9/545 713/166 |
| 2010/0174771 A1 | 7/2010 | Cobb | | |
| 2011/0035746 A1 | 2/2011 | Takai | | |
| 2011/0231508 A1* | 9/2011 | Torii | ..................... | H04L 61/103 709/208 |
| 2011/0239017 A1 | 9/2011 | Zomaya et al. | | |
| 2011/0258246 A1* | 10/2011 | Khandekar | ........... | G06F 9/5027 709/201 |
| 2015/0012593 A1* | 1/2015 | Phillips | ................. | H04L 47/823 709/204 |
| 2015/0032846 A1* | 1/2015 | Doken | .................... | H04W 4/60 709/217 |
| 2015/0074216 A1* | 3/2015 | Park | .................... | H04L 41/5025 709/208 |
| 2015/0095916 A1* | 4/2015 | Saga | .................... | G06F 9/5066 718/102 |
| 2015/0156266 A1* | 6/2015 | Gupta | ..................... | H04L 67/12 709/224 |
| 2016/0087915 A1* | 3/2016 | Marr | .................. | H04L 43/0882 709/226 |
| 2016/0321480 A1* | 11/2016 | Hamlin | ................. | G16H 20/17 |

FOREIGN PATENT DOCUMENTS

| | | |
|---|---|---|
| JP | 2007-188456 A | 7/2007 |
| JP | 2008-83981 A | 4/2008 |
| JP | 2009-217405 A | 9/2009 |
| JP | 2012-504800 A | 2/2012 |
| JP | 2012-514791 A | 6/2012 |
| JP | 2015-82225 A | 4/2015 |

* cited by examiner

FIG. 3

| | AP ATTACHED INFORMATION | |
|---|---|---|
| NO. | EXECUTION FILE NAME | EXECUTION POSSIBILITY JUDGMENT CRITERION DEVICE NUMBER |
| 1 | FIRST EXECUTION FILE | 1 |
| 2 | SECOND EXECUTION FILE | 1 |
| 3 | THIRD EXECUTION FILE | 2 |
| ⋮ | ⋮ | ⋮ |

| CONNECTED DEVICE INFORMATION | |
|---|---|
| NO. | DEVICE ID |
| 1 | 192.168.1.100 |
| 2 | 192.168.1.101 |
| 3 | 192.168.1.102 |
| ⋮ | ⋮ |

| | EXECUTION RESPOSIVILITY ASSIGNMENT INFORMATION | |
|---|---|---|
| NO. | EXECUTION FILE NAME | DEVICE ID |
| 1 | FIRST EXECUTION FILE | 192.168.1.100 |
| 2 | SECOND EXECUTION FILE | 192.168.1.101 |
| 3 | THIRD EXECUTION FILE | 192.168.1.102 |
| ⋮ | ⋮ | ⋮ |

| CONNECTED DEVICE INFORMATION | |
|---|---|
| NO. | DEVICE ID |
| 1 | 192.168.1.100 |
| 2 | 192.168.1.101 |
| 3 | 192.168.1.102 |
| 4 | 192.168.1.103 |

| AP ATTACHED INFORMATION | | |
|---|---|---|
| NO. | EXECUTION FILE NAME | EXECUTION POSSIBILITY JUDGMENT CRITERION DEVICE NUMBER |
| 1 | FIRST EXECUTION FILE | 1 |
| 2 | SECOND EXECUTION FILE | 1 |
| 3 | THIERD EXECUTION FILE | 2 |
| 4 | FOURTH EXECUTION FILE | 2 |
| 5 | FIFTH EXECUTION FILE | 2 |
| 6 | SIXTH EXECUTION FILE | 2 |
| 7 | SEVENTH EXECUTION FILE | 4 |
| 8 | EIGHTH EXECUTION FILE | 5 |

| EXECUTION RESPONSIBILITY ASSIGNMENT INFORMATION |||
|---|---|---|
| NO. | EXECUTION FILE NAME | DEVICE ID |
| 1 | FIRST EXECUTION FILE | 192.168.1.100 |
| 2 | SECOND EXECUTION FILE | 192.168.1.101 |
| 3 | THIERD EXECUTION FILE | 192.168.1.102 |
| 4 | FOURTH EXECUTION FILE | 192.168.1.103 |
| 5 | FIFTH EXECUTION FILE | 192.168.1.100 |
| 6 | SIXTH EXECUTION FILE | 192.168.1.101 |
| 7 | SEVENTH EXECUTION FILE | 192.168.1.102 |
| 8 | EIGHTH EXECUTION FILE | – |

| EXECUTION RESPONSIBILITY ASSIGNMENT INFORMATION | | |
|---|---|---|
| NO. | EXECUTION FILE NAME | DEVICE ID |
| 1 | FIRST EXECUTION FILE | 192.168.1.100 |
| 2 | SECOND EXECUTION FILE | 192.168.1.101 |
| 3 | THIERD EXECUTION FILE | 192.168.1.102 |
| 4 | FOURTH EXECUTION FILE | 192.168.1.103 |
| 5 | FIFTH EXECUTION FILE | 192.168.1.100 |
| 6 | SIXTH EXECUTION FILE | 192.168.1.101 |
| 7 | SEVENTH EXECUTION FILE | 192.168.1.102 |
| 8 | EIGHTH EXECUTION FILE | 192.168.1.104 |

FIG. 23

| MONITORING-USE CONNECTED DEVICE INFORMATION 326 ||
|---|---|
| NO. | DEVICE ID |
| 1 | 192.168.1.100 |
| 2 | 192.168.1.101 |
| 3 | 192.168.1.104 |

| EXECUTION RESPONSIBILITY ASSIGNMENT INFORMATION | | |
|---|---|---|
| NO. | EXECUTION FILE NAME | DEVICE ID |
| 1 | FIRST EXECUTION FILE | 192.168.1.100 |
| 2 | SECOND EXECUTION FILE | 192.168.1.102 |
| 3 | THIERD EXECUTION FILE | 192.168.1.104 |
| 4 | FOURTH EXECUTION FILE | 192.168.1.100 |
| 5 | FIFTH EXECUTION FILE | 192.168.1.102 |
| 6 | SIXTH EXECUTION FILE | 192.168.1.104 |
| 7 | SEVENTH EXECUTION FILE | - |
| 8 | EIGHTH EXECUTION FILE | - |

| NO. | EXECUTION FILE NAME | LOCATION | EXECUTION POSSIBILITY JUDGMENT CRITERION DEVICE NUMBER |
|---|---|---|---|
| colspan="4" | | | |

| | AP ATTACHED INFORMATION | | |
|---|---|---|---|
| NO. | EXECUTION FILE NAME | LOCATION | EXECUTION POSSIBILITY JUDGMENT CRITERION DEVICE NUMBER |
| 1 | FIRST EXECUTION FILE | http://Server/AppA | 1 |
| 2 | SECOND EXECUTION FILE | http://Server/AppB | 1 |
| 3 | THIRD EXECUTION FILE | http://Server/AppC | 2 |
| ⋮ | ⋮ | ⋮ | ⋮ |

| | EXECUTION RESPONSIBILITY ASSIGNMENT INFORMATION | | |
|---|---|---|---|
| NO. | EXECUTION FILE NAME | LOCATION | DEVICE ID |
| 1 | FIRST EXECUTION FILE | http://Server/AppA | 192.168.1.100 |
| 2 | SECOND EXECUTION FILE | http://Server/AppB | 192.168.1.101 |
| 3 | THIRD EXECUTION FILE | http://Server/AppC | 192.168.1.102 |
| ⋮ | ⋮ | ⋮ | ⋮ |

| AP ATTACHED INFORMATION | | |
|---|---|---|
| NO. | EXECUTION FILE NAME | EXECUTION POSSIBILITY JUDGMENT CRITERION DEVICE NUMBER |
| 1 | SCHEDULING FUNCTION | 1 |
| 2 | HOT/COOL FEELING CHARACTERISTIC ESTIMATION FUNCTION | 1 |
| 3 | SET-TEMPEPATURE CONTROL FUNCTION | 1 |
| 4 | RESCHEDULING FUNCTION | 2 |

| EXECUTION RESPOSIVILITY ASSIGNMENT INFORMATION | | |
|---|---|---|
| NO. | EXECUTION FILE NAME | DEVICE ID |
| 1 | SCHEDULING FUNCTION | 192.168.1.100 |
| 2 | HOT/COOL FEELING CHARACTERISTIC ESTIMATION FUNCTION | 192.168.1.101 |
| 3 | SET-TEMPEPATURE CONTROL FUNCTION | 192.168.1.102 |
| 4 | RESCHEDULING FUNCTION | 192.168.1.100 |

INFORMATION PROCESSING SYSTEM, INFORMATION PROCESSING DEVICE, AND INFORMATION PROCESSING METHOD

TECHNICAL FIELD

The present invention relates to an information processing system, an information processing device, and an information processing method, and in particular to an information processing system, an information processing device, and an information processing method for executing an application in a distributed manner.

BACKGROUND ART

Recently, device cooperation systems have been used, in which devices, such as home electrical appliances and sensor devices, are controlled through a network such as a Local Area Network (LAN). Usually, in these device cooperation systems, an application executed by one device controller obtains information from each device and makes a request for operation to each device for the purpose of implementing visualization of device information and automatic operation of the devices.

As the number of devices connectable to a network increases, an application comes to have advanced functions. However, since a processing load applied to the device controller increases owing to the advanced functions, it is necessary to install a high performance Central Processing Unit (CPU) or to install a plurality of CPUs for distributed processing in order to secure adequate performance of the device controller.

Distributed processing to be executed by a plurality of CPUs requires a main CPU that manages the plurality of CPUs. The main CPU performs division of processing workload, assignment of the divided parts of processing to respective CPUs, switching of the divided parts of processing, control of memory access, access control of input/output data, and the like. If, in such unified management by the main CPU, simultaneous operation of a plurality of the parts of processing occurs, processing to be executed is concentrated in the main CPU and delay of processing generates overhead. When overhead is generated, it becomes difficult to secure the adequate performance of the device controller.

With respect to the above problems, Patent Reference 1 discloses a data processing system for executing an application by distributing the processing to a plurality of devices connected with one another through communication lines. At the time of execution of an application in this data processing system, script codes describing contents of data processing is referred to in order to separate the data processing into a plurality of units of processing, each of the units of processing is assigned to one of the devices, and each of the devices executes the assigned unit of processing.

PRIOR ART REFERENCE

Patent Reference

Patent Reference 1: Japanese Patent Application Publication No. 2007-188456

SUMMARY OF THE INVENTION

Problem to be Solved by the Invention

As such a conventional data processing system sequentially interprets the script codes to distribute processing in the course of execution of an application, overhead of the interpretation processing and the distribution processing is generated and the processing speed of the system as a whole is reduced. This causes a problem in that it becomes difficult to respond immediately to an operation of a device and to display information in real time in a device cooperation system.

Further, in the case where the number of connected devices is small, the amount of processing to be executed by each device becomes larger and a heavy load is applied to the CPU. This causes a problem in that, in a device on which a low-performance CPU is installed, execution of an application may fail, and a device cooperation system cannot be implemented.

Thus, an object of the present invention is to make it possible to execute an application in a distributed manner without generating overhead due to distributed processing.

Means of Solving the Problem

One embodiment of the present invention provides an information processing system comprising a plurality of information processing devices to execute an application including a plurality of execution files in a distributed manner through a network. Each of the plurality of information processing devices includes an input part to receive input of an execution instruction of the application, an application division setting part to assign execution responsibility for each of the plurality of execution files to one of the plurality of information processing devices and to generate first execution responsibility assignment information indicating each of the execution files and an information processing device to which the execution responsibility for each of the execution files is assigned, when the input part receives the input of the execution instruction, a sending part to send the first execution responsibility assignment information to the network, a receiving part to receive second execution responsibility assignment information indicating each of the execution files and an information processing device to which the execution responsibility for each of the execution files is assigned, the second execution responsibility assignment information being generated by another information processing device included in the plurality of information processing devices, and an application division execution part to refer to the first execution responsibility assignment information or the second execution responsibility assignment information and to execute an execution file whose execution responsibility is assigned to its own device out of the plurality of execution files.

Another embodiment of the present invention provides an information processing device used as one of a plurality of information processing devices to execute an application including a plurality of execution files in a distributed manner through a network. The information processing device includes an input part to receive input of an execution instruction of the application, an application division setting part to assign execution responsibility for each of the plurality of execution files to one of the plurality of information processing devices and to generate first execution responsibility assignment information indicating each of the execution files and an information processing device to which the execution responsibility for each of the execution files is assigned, when the input part receives the input of the execution instruction, a sending part to send the first execution responsibility assignment information to the network, a receiving part to receive second execution responsibility assignment information indicating each of the execution files and an information processing device to which the execution responsibility for each of the execution files is assigned, the second execution responsibility assignment information being generated by another information processing device included in the plurality of information processing devices, and an application division execution part to refer to the first execution responsibility assignment information or the second execution responsibility assignment information and to execute an execution file whose execution responsibility is assigned to its own device out of the plurality of execution files.

Another embodiment of the present invention provides an information processing method performed by an information processing device used as one of a plurality of information processing devices to execute an application including a plurality of execution files in a distributed manner through a network. The information processing method includes assigning execution responsibility for each of the plurality of execution files to one of the plurality of information processing devices, generating execution responsibility assignment information that indicates each of the execution files and an information processing device to which the execution responsibility for each of the execution files is assigned, sending the execution responsibility assignment information to the network, and referring to the execution responsibility assignment information and executing an execution file whose execution responsibility is assigned to its own device out of the plurality of execution files.

Effects of the Invention

According to one embodiment of the present invention, execution responsibilities for execution files included in an application are previously assigned to information processing devices connected to a network, and each information processing device executes only an assigned execution file; thereby it is possible to execute the application in a distributed manner without generating overhead due to distributed processing.

BRIEF DESCRIPTION OF THE DRAWINGS

FIG. 3 is a schematic diagram illustrating a first example of AP attached information in the embodiment 1;

FIG. 4 is a schematic diagram illustrating a first example of connected device information in the embodiment 1;

FIG. 5 is a schematic diagram illustrating a first example of execution responsibility assignment information in the embodiment 1;

FIG. 9 is a schematic diagram illustrating a second example of the connected device information in the embodiment 1;

FIG. 10 is a schematic diagram illustrating a second example of the AP attached information in the embodiment 1;

FIG. 12 is a schematic diagram illustrating a second example of the execution responsibility assignment information in the embodiment 1;

FIG. 20 is a schematic diagram illustrating an example of execution responsibility assignment information in the embodiment 2;

FIG. 23 is a schematic diagram illustrating an example of monitoring-use connected device information in the embodiment 3;

FIG. 26 is a schematic diagram illustrating an example of execution responsibility assignment information in the embodiment 3;

FIG. 29 is a schematic diagram illustrating an example of AP attached information in the embodiment 4;

FIG. 30 is a schematic diagram illustrating an example of execution responsibility assignment information in the embodiment 4;

FIG. 34 is a schematic diagram illustrating an example of AP attached information in the embodiment 5; and FIG. 35 is a schematic diagram illustrating an example of execution responsibility assignment information in the embodiment 5.

MODE FOR CARRYING OUT THE INVENTION

Embodiment 1

Figure 1:
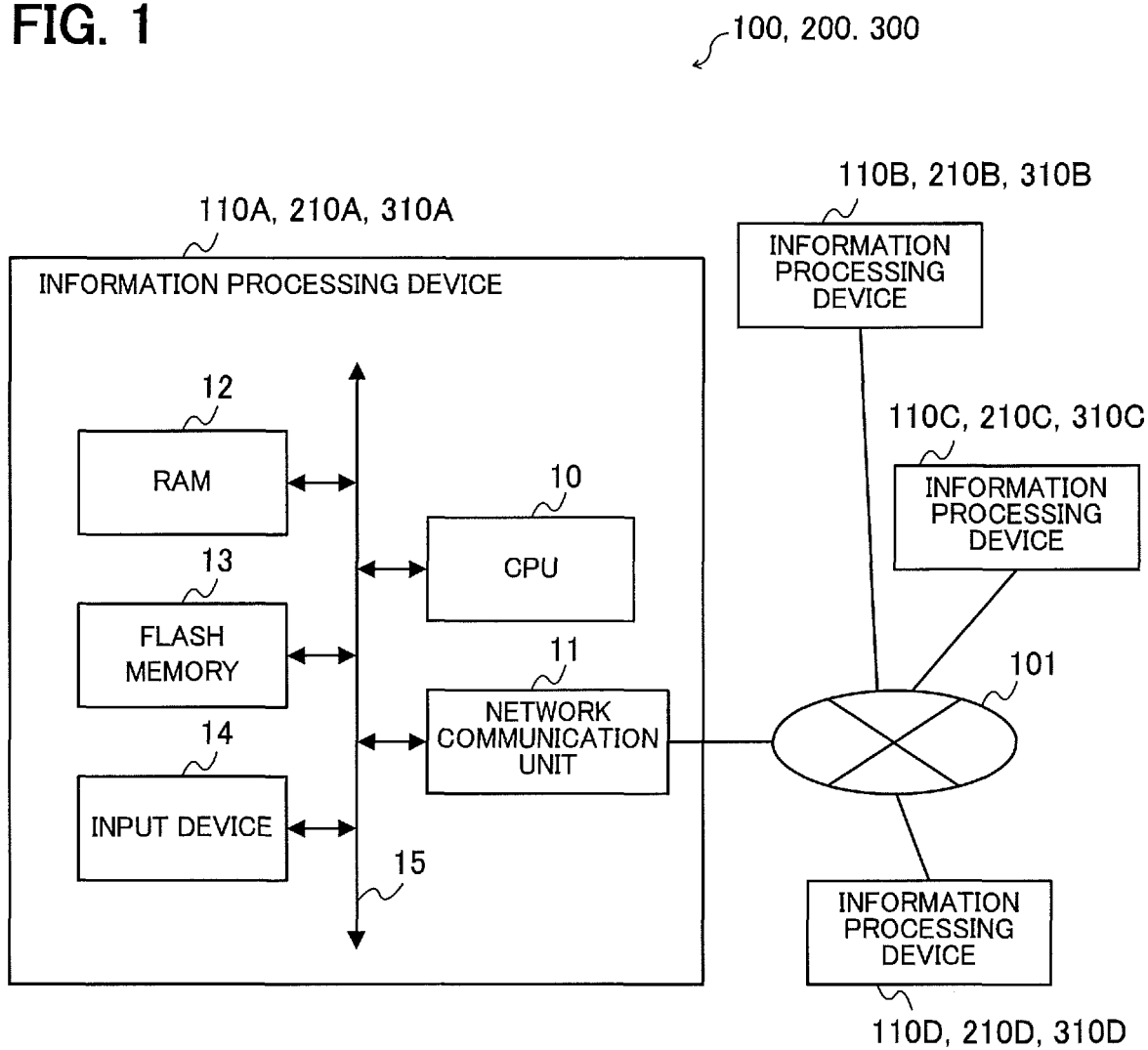
FIG. 1 is a schematic diagram illustrating an information processing system of embodiments 1 to 3.

FIG. 1 is a schematic diagram illustrating an information processing system 100 according to an embodiment 1.

The information processing system 100 has a plurality of information processing devices 110A-110D, and executes an application (hereinafter referred to as AP) having a plurality of execution files in a distributed manner. Here, when it is not necessary to differentiate each of the information processing devices 110A to 110D, each device is referred to as an information processing device 110. The information processing devices 110 are connected to a LAN 101 as a network, so that data communication can be performed between the plurality of information processing devices 110. Incidentally, the LAN 101 is a local area network constructed in a building, and may or may not be connected to the Internet.

As shown in FIG. 1, each information processing device 110 has a hardware configuration including a processor such as a CPU 10, a network communication unit 11, storage devices such as a Random Access memory (RAM) 12 and a flash memory 13, an input device 14, and a bus 15.

The CPU 10 loads the AP onto the RAM 12 and executes the loaded AP.

The network communication unit 11 performs data communication with the other information processing devices 110 via the LAN 101.

The RAM 12 is a volatile memory accessed by the CPU 10.

The flash memory 13 is a nonvolatile memory that stores the AP.

The input device 14 receives an instruction from a user. For example, the input device 14 receives input of an activation setting start request as an execution instruction of the AP from a user. In detail, the input device 14 has buttons or a remote control light receiving section.

The bus 15 connects the CPU 10, the network communication unit 11, the RAM 12, the flash memory 13, and the input device 14, so that data can be sent and received by the connected parts.

Figure 2:
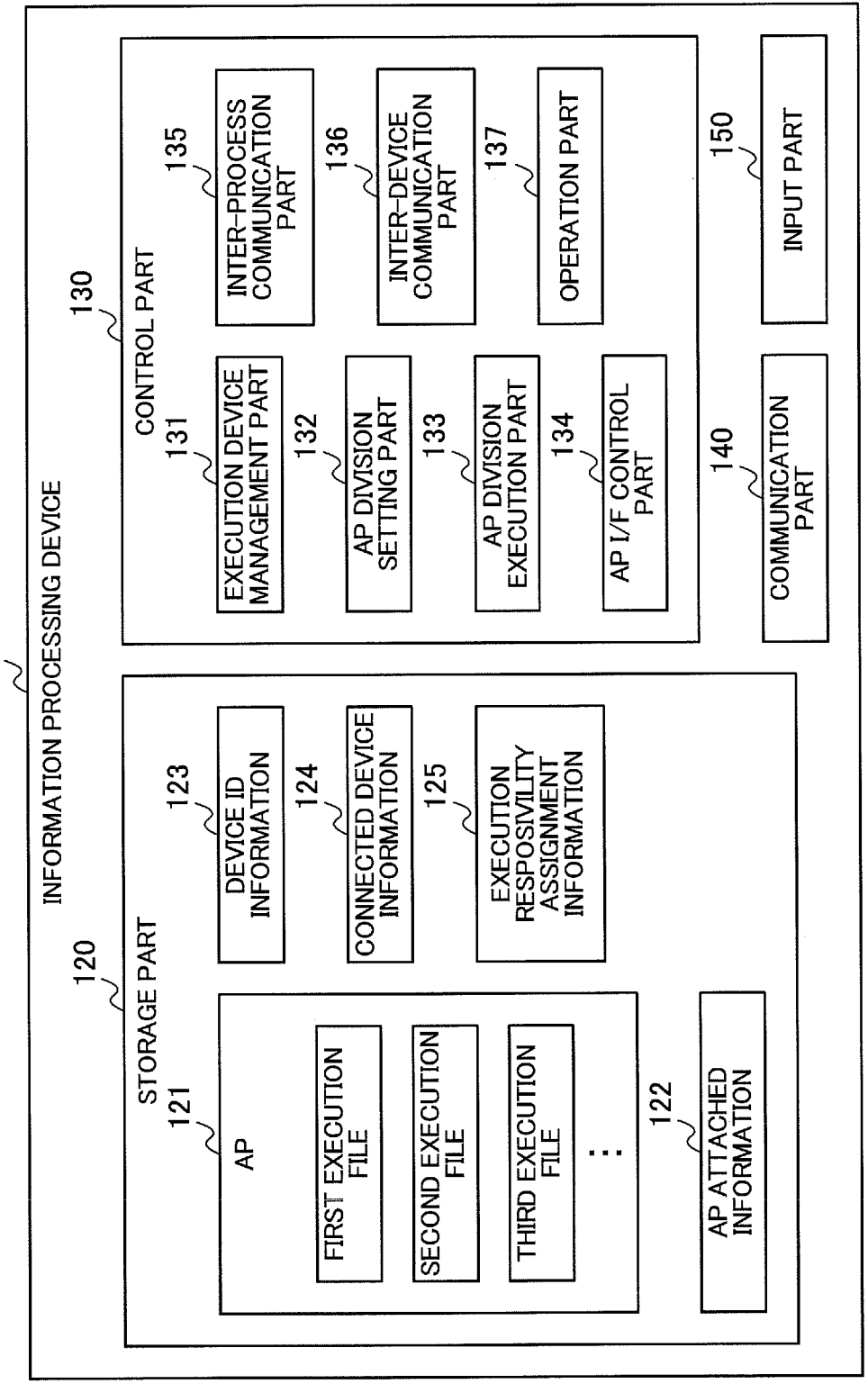
FIG. 2 is a block diagram illustrating schematically a functional configuration of an information processing device of the embodiment 1.

FIG. 2 is a block diagram illustrating schematically a functional configuration of each information processing device 110 in the embodiment 1.

Each information processing device 110 has a storage part 120, a control part 130, a communication part 140, and an input part 150.

The storage part 120 stores information and programs required for processing in the information processing device 110. For example, the storage part 120 stores the AP 121, AP attached information 122, device ID information 123, connected device information 124, and execution responsibility assignment information 125.

The AP 121 has a plurality of execution files. The execution file is a file that the CPU 10 can directly read into the RAM 12 and execute. For example, the AP 121 has the plurality of execution files that are generated by converting programs written in a high-level language such as C language, Java language, or the like into executable formats. The AP 121 achieves one or more functions by making the plurality of execution files operate in cooperation. Specifically, as one of device cooperation systems, a Home Energy Management System (HEMS) can be mentioned. A HEMS has a function of obtaining and displaying operating conditions of home electrical appliances and a function of operating the home electrical appliances automatically according to a life schedule, for example. These functions are achieved by executing execution files of a communication program, a display program, a schedule program, a device management program, an operation management program, and the like.

The AP attached information 122 indicates the execution files included in the AP 121 and execution conditions for executing the execution files.

FIG. 3 is a schematic diagram illustrating one example of the AP attached information 122.

As shown in the figure, the AP attached information 122 is information having a No column 122a, an execution file name column 122b, and an execution possibility judgment criterion device number column 122c in a table format.

The No column 122a stores an identification number for identifying each row contained in the AP attached information 122.

The execution file name column 122b stores an execution file name as execution file identification information for identifying an execution file included in the AP 121.

The execution possibility judgment criterion device number column 122c stores an execution possibility judgment criterion device number as a condition for executing an execution file. An execution possibility judgment criterion device number is the number of devices required for executing an execution file. For example, it is determined that the associated execution file can be executed when the number of information processing devices 110 connected to the LAN 101 is more than or equal to the execution possibility judgment criterion device number.

The AP 121 and the AP attached information 122 are stored in advance in the flash memory 13, for example.

Returning to FIG. 2, the device ID information 123 indicates a device ID as identification information of the information processing device 110 itself. A device ID may be an Internet Protocol (IP) address, or a Media Access Control (MAC) address. Alternatively, a device ID may be unique identification information generated by a predetermined algorithm.

The connected device information 124 indicates the device IDs of the information processing devices 110 connected to the LAN 101.

FIG. 4 is a schematic diagram illustrating one example of the connected device information 124.

As shown in the figure, the connected device information 124 is information having a No column 124a and a device ID column 124b in a table format.

The No column 124a stores an identification number for identifying each row contained in the connected device information 124.

The device ID column 124b stores a device ID of an information processing device 110 connected to the LAN 101.

The connected device information 124 is stored in the RAM 12 or the flash memory 13.

Returning to FIG. 2, the execution responsibility assignment information 125 indicates an information processing device 110 that is assigned execution responsibility for each execution file.

FIG. 5 is a schematic diagram illustrating one example of the execution responsibility assignment information 125.

As shown in the figure, the execution responsibility assignment information 125 is information having a No column 125a, an execution file name column 125b, and a device ID column 125c in a table format.

The No column 125a stores an identification number for identifying each row contained in the execution responsibility assignment information 125.

The execution file name column 125*b* stores an execution file name of an execution file included in the AP 121.

The device ID column 125*c* stores a device ID of an information processing device 110 that is assigned responsibility for executing the execution file identified by the execution file name column 125*b*.

The execution responsibility assignment information 125 is stored in the RAM 12 or the flash memory 13.

In one case, the execution responsibility assignment information 125 is generated by the device itself and stored in the storage part 120; and, in the other case, the execution responsibility assignment information 125 is generated and sent by another information processing device 110, and received by the communication part 140 and stored in the storage part 120. In the following, the execution responsibility assignment information 125 that is generated by the device itself and stored in the storage part 120 is also referred to as first execution responsibility assignment information; and the execution responsibility assignment information 125 that is generated by another information processing device 110 and stored in the storage part 120 is also referred to as second execution responsibility assignment information.

Returning to FIG. 2, the control part 130 controls processing in the information processing device 110.

The control part 130 has an execution device management part 131, an AP division setting part 132, an AP division execution part 133, an AP interface control part (hereinafter, referred to as AP I/F control part) 134, an inter-process communication part 135, an inter-device communication part 136, and an operation part 137.

The execution device management part 131 obtains the device ID of the information processing device 110 that is its own device, when its own device is activated, and stores the device ID information 123 indicating the obtained device ID in the storage part 120.

Further, the execution device management part 131 detects the information processing devices 110 connected to the LAN 101, and obtains a unique device ID held by each information processing device 110. Then, the execution device management part 131 generates the connected device information 124 as shown in FIG. 4, and stores the connected device information 124 in the storage part 120. The connected device information 124 contains the device ID of its own device shown by the device ID information 123.

When the input part 150 receives an instruction to execute the AP, the AP division setting part 132 assigns responsibility for executing each of the plurality of execution files included in the AP to one of the plurality of information processing devices 110 included in the information processing system 100. For example, the AP division setting part 132 judges whether an execution file corresponding to an execution file name written in the AP attached information 122 is executable, and assigns execution responsibility for the execution file that is judged to be executable to an information processing device 110 registered in the connected device information 124.

Then, as shown in FIG. 5, the AP division setting part 132 generates the execution responsibility assignment information 125 that indicates each execution file and the information processing device 110 to which the execution responsibility is assigned for each execution file, and stores the generated execution responsibility assignment information 125 in the storage part 120. In the case of the execution responsibility assignment information 125 shown in FIG. 5, the first execution file is to be executed by the information processing device 110 identified by the device ID 192.168.1.100; the second execution file is to be executed by the information processing device 110 identified by the device ID 192.168.1.101; and the third execution file is to be executed by the information processing device 110 identified by the device ID 192.168.1.102.

The AP division execution part 133 refers to the execution responsibility assignment information 125, obtains the execution file assigned to its own device from the flash memory 13, and executes the obtained execution file.

When an execution request for another execution file occurs in the course of processing an execution file under execution, the AP I/F control part 134 judges which information processing device 110 is executing the target execution file of the execution request. In the case where the information processing device 110 executing the target execution file is its own device, the AP I/F control part 134 sends an inter-process communication request as an execution request for the processing to the target execution file via the inter-process communication part 135. In the case where the information processing device 110 executing the target execution file is another information processing device 110, the AP I/F control part 134 sends an inter-device communication request as an execution request for the processing to that information processing device 110 via the inter-device communication part 136 and the communication part 140.

The inter-process communication part 135 performs sending and receiving data between execution files that are being executed by the same information processing device 110. As a method of sending and receiving data by inter-process communication, a method using a message queue or a shared memory supported by the Operating System (OS) can be applied, for example.

The inter-device communication part 136 performs, via communication part 140, sending data to and receiving data from an execution file that is being executed by a different information processing device 110. As a method of sending and receiving data by inter-device communication, a method of using network sockets supported by the OS can be applied, for example.

The operation part 137 detects an instruction inputted to the input part 150. For example, in the case where the input device 14 functioning as the input part 150 is a button, the operation part 137 detects pressing-down of the button, while in the case where the input device 14 is a remote control light receiving section, the operation part 137 detects a remote control signal.

In the case where the information processing device 110 is not provided with an input device 14, the operation part 137 detects an AP activation setting start command received by the network communication unit 11 functioning as the communication part 140. By detecting these, the operation part 137 receives an AP activation setting start operation from a user.

The communication part 140 communicates with another information processing device 110 via the LAN 101. For example, the communication part 140 functions as a sending part that sends information to the LAN 101 and as a receiving part that receives information from the LAN 101.

The input part 150 receives input of an instruction from a user. For example, the input part 150 receives input of an AP execution instruction.

The storage part 120 of the above-described information processing device 110 can be implemented by the CPU 10 shown in FIG. 1 using the RAM 12 or the flash memory 13.

The control part 130 can be implemented by the CPU 10 reading out programs stored in the flash memory 13 into the RAM 12 and executing the programs.

The communication part 140 can be implemented by the CPU 10 using the network communication unit 11.

The input part 150 can be implemented by the CPU 10 using the input device 14.

Figure 6:
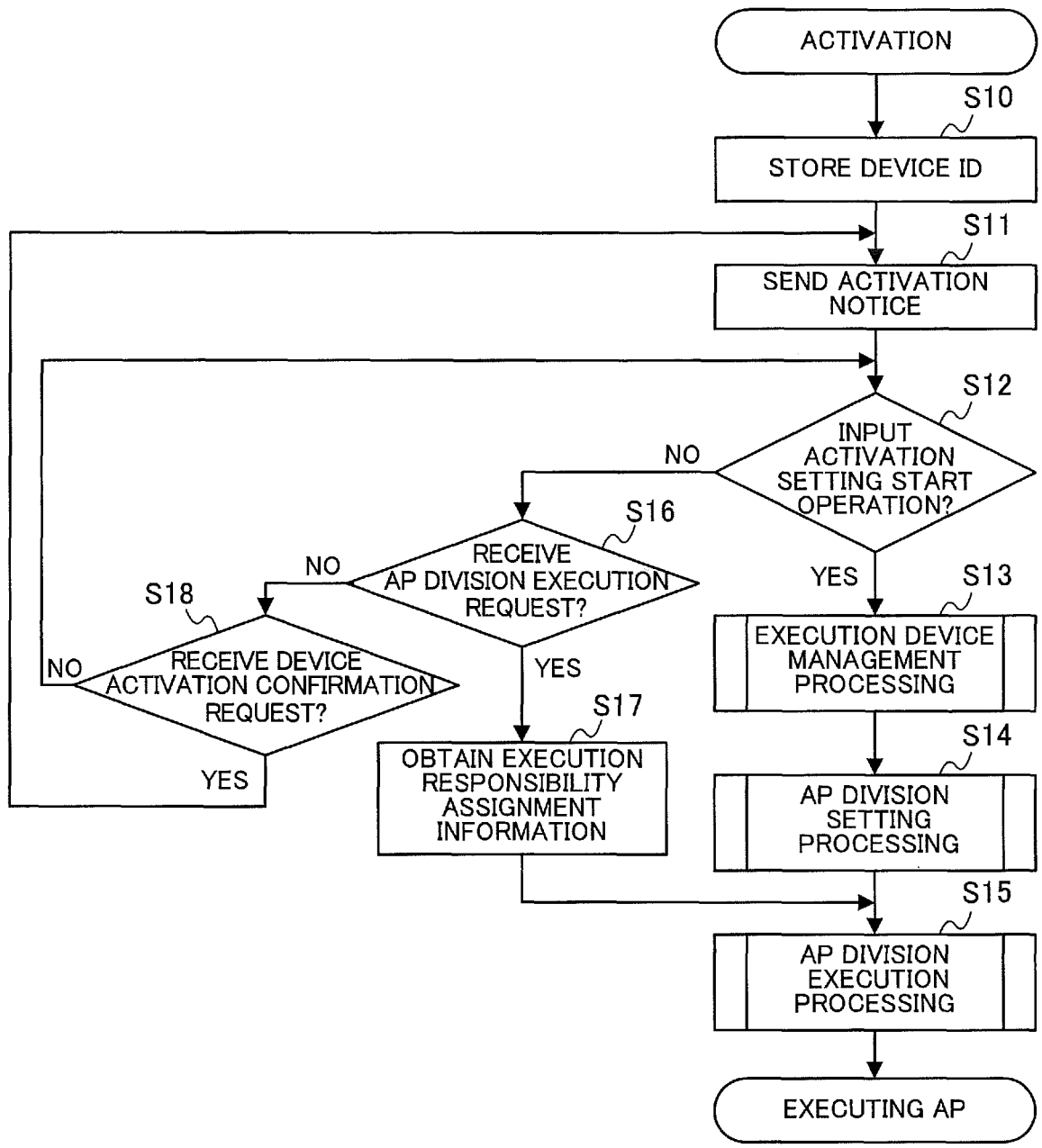
FIG. 6 is a flowchart indicating a general processing procedure in the information processing device in the embodiment 1.

FIG. 6 is a flowchart indicating a general processing procedure of the information processing device 110 in the embodiment 1. In the following, based on FIG. 6, main processing of the information processing device 110 after activation will be described.

When the information processing device 110 is activated, the execution device management part 131 obtains the device ID unique to the information processing device 110 that is its own device, and generates the device ID information 123 indicating the obtained device ID. Then, the execution device management part 131 stores the generated device ID information 123 in the storage part 120 (S10). Here, in the case where the device ID is an IP address or a MAC address, the execution device management part 131 can obtain the device ID from the communication part 140.

Next, the execution device management part 131 causes the communication part 140 to send an activation notice together with the device ID obtained in step S10 to the information processing devices 110 connected to the LAN 101 by use of a multiple-address-notification means such as a multicast or the like (S11).

After sending the activation notice, the control part 130 enters a state of awaiting an activation setting start operation of the AP 121 from a user (S12), a state of awaiting receiving an AP division execution request from another information processing device 110 (S16), or a state of awaiting receiving a device activation confirmation request from another information processing device 110 (S18).

In step S12, when the operation part 137 detects input of the activation setting start operation of the AP 121 from the user (YES in S12), the processing proceeds to step S13.

In step S13, the execution device management part 131 performs execution device management processing. Here, the execution device management part 131 causes the communication part 140 to send a device activation confirmation request to the information processing devices connected to the LAN 101, and receive an activation notification from each information processing device 110 that has received the device activation confirmation request. Through this processing, the execution device management part 131 detects the information processing devices 110 connected to the LAN 101 and generates the connected device information 124 indicating the device ID of each information processing device 110 detected.

Next, the AP division setting part 132 performs AP division setting processing (S14). Here, the AP division setting part 132 judges whether each execution file is executable, assigns execution responsibility for an execution file that is judged to be executable to one of the information processing devices 110 detected in step S13, thereby generates the execution responsibility assignment information 125, and stores the generated information 125 in the storage part 120. Then, the AP division setting part 132 causes the communication part 140 to send an AP division execution request together with the generated execution responsibility assignment information 125 to every information processing device 110 detected in step S13.

Next, the AP division execution part 133 performs AP division execution processing (S15). For example, the AP division execution part 133 refers to the execution responsibility assignment information 125 stored in the storage part 120, and executes all the execution files assigned to its own device (S15). By this processing, the information processing device 110 enters in a state of executing the AP 121.

The processing in steps S13 and S14 is executed only by the information processing device 110, as a master device, which has received the AP activation setting start operation from the user. As shown in following steps S16 to S18 and in step S15, the information processing devices 110 other than the master device function as slave devices and execute the execution files assigned to themselves by referring to the execution responsibility assignment information 125 sent from the master device.

In step S16, when the communication part 140 receives an AP division execution request from another information processing device functioning as a master device (Yes in S16), the processing proceeds to step S17.

In step S17, the AP division execution part 133 obtains the execution responsibility assignment information 125 sent together with the AP division execution request and stores the obtained execution responsibility assignment information 125 in the storage part 120. Then, the processing proceeds to step S15.

In step S18, when the communication part 140 receives a device activation confirmation request from another information processing device 110 functioning as a master device (Yes in S18), the processing proceeds to step S11. When the communication part has not received such a request (No in S18), the processing proceeds to step S12.

Figure 7:
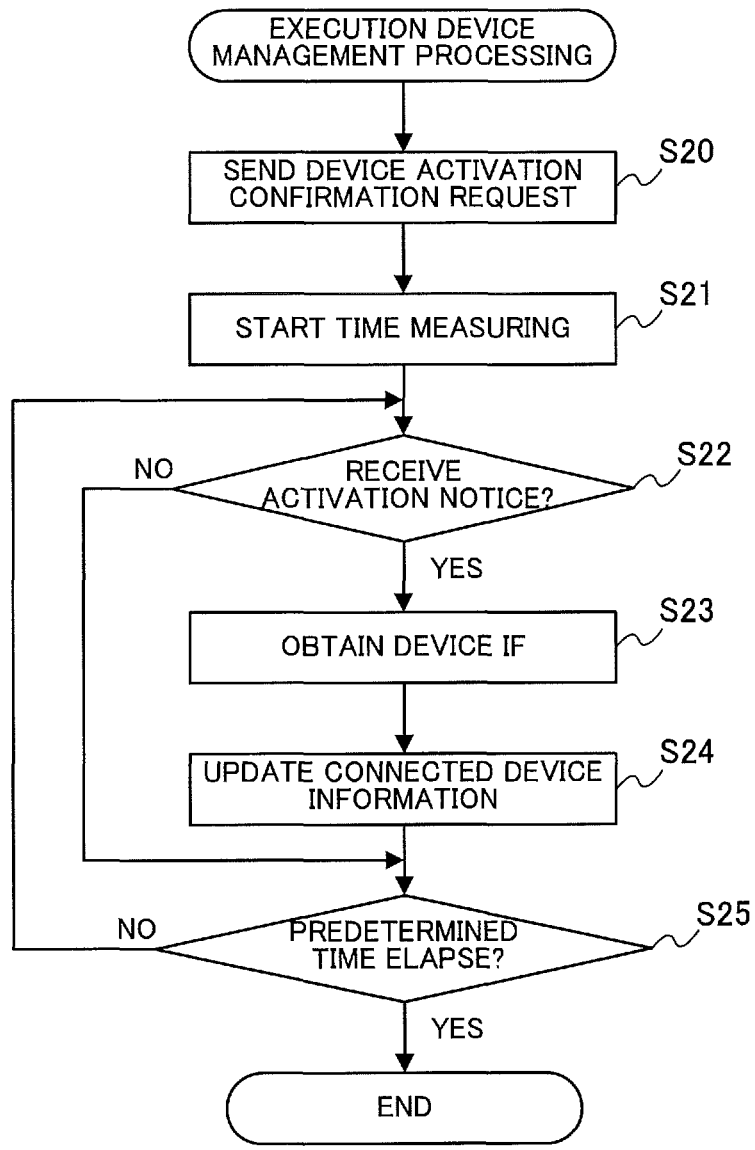
FIG. 7 is a flowchart indicating execution device management processing in the embodiment 1.
Figure 16:
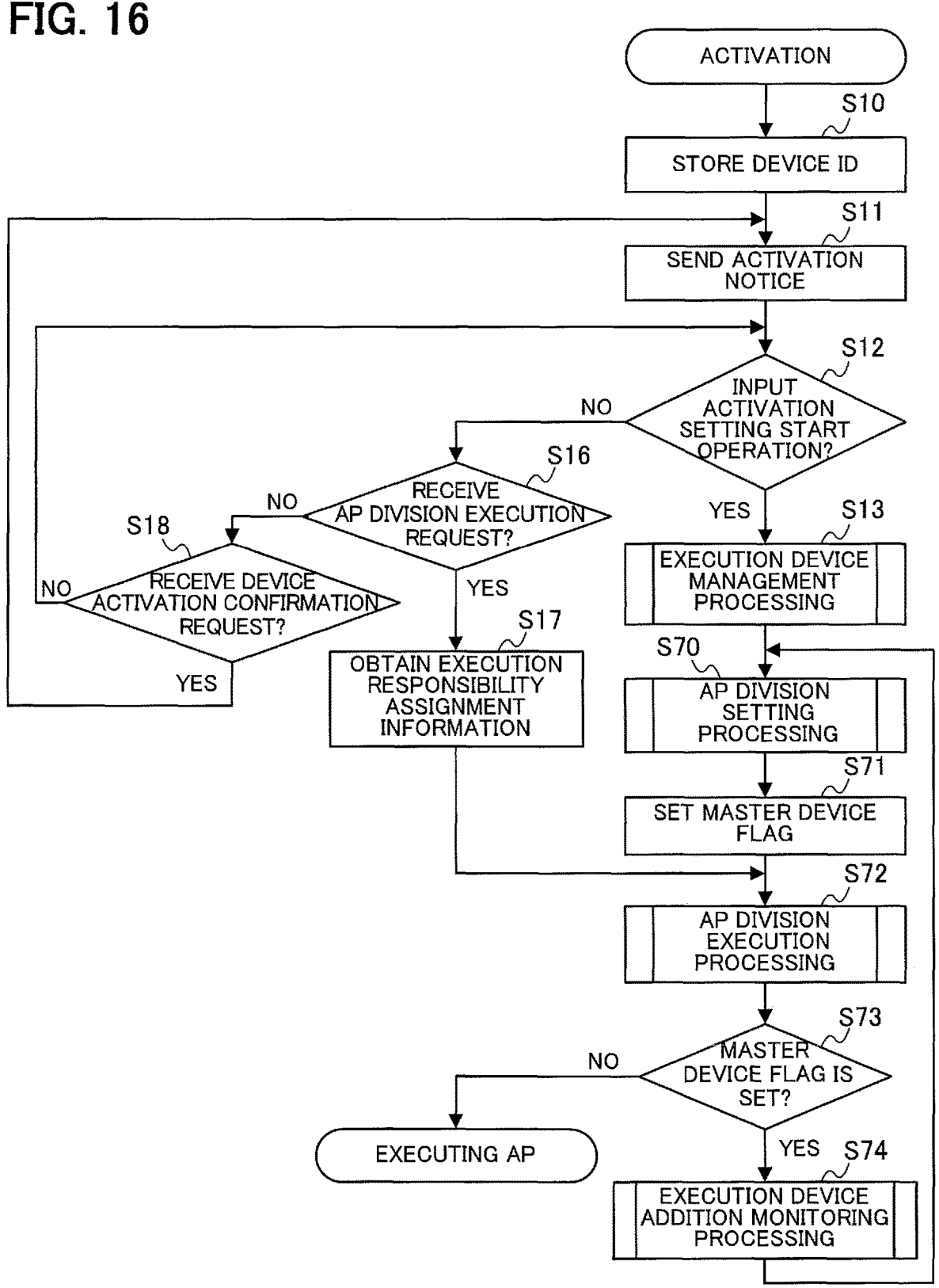
FIG. 16 is a flowchart indicating a general processing procedure of the information processing device in the embodiment 2.

FIG. 7 is a flowchart indicating the execution device management processing performed in step S13 of FIG. 16.

When the execution device management processing is started, the execution device management part 131 causes the communication part 140 to send a device activation confirmation request to the information processing device 110 connected to the LAN 101 by means of the multiple-address-notification means such as a multicast or the like (S20). Here, in the case where the connected device information 124 is stored in the storage part 120, the execution device management part 131 initializes the connected device information 124 to delete all the rows and then stores its own device ID, which is indicated by the device ID information 123, in the connected device information 124. In the case where the connected device information 124 is not stored in the storage part 120, the execution device management part 131 generates connected device information 124 that stores its own device ID, which is indicated by the device ID information 123, and stores the generated connected device information 124 in the storage part 120.

Next, the execution device management part 131 starts time measuring (S21), and checks whether an activation notice has been received from another information processing device 110 (S22).

In the case where the communication part 140 has received the activation notice in step S22 (Yes in S22), the processing proceeds to step S23, while in the case where the communication part 140 has not received the activation notice (No in S22), the processing proceeds to step S25.

In step S23, the execution device management part 131 obtains the device ID sent together with the activation notice.

Then, the execution device management part 131 updates the connected device information 124 by storing the device ID obtained in step S23 in the connected device information 124 (S24).

In step S25, the execution device management part 131 judges whether a predetermined time has elapsed. In the case where the predetermined time has elapsed (Yes in S25), the execution device management part 131 ends the execution device management processing. In the case where the predetermined time has not elapsed (No in S25), the processing proceeds to step S22.

In this way, the execution device management part 131 performs the execution device management processing for the predetermined time, to detect the information processing devices 110 connected to the LAN 101.

Figure 8:
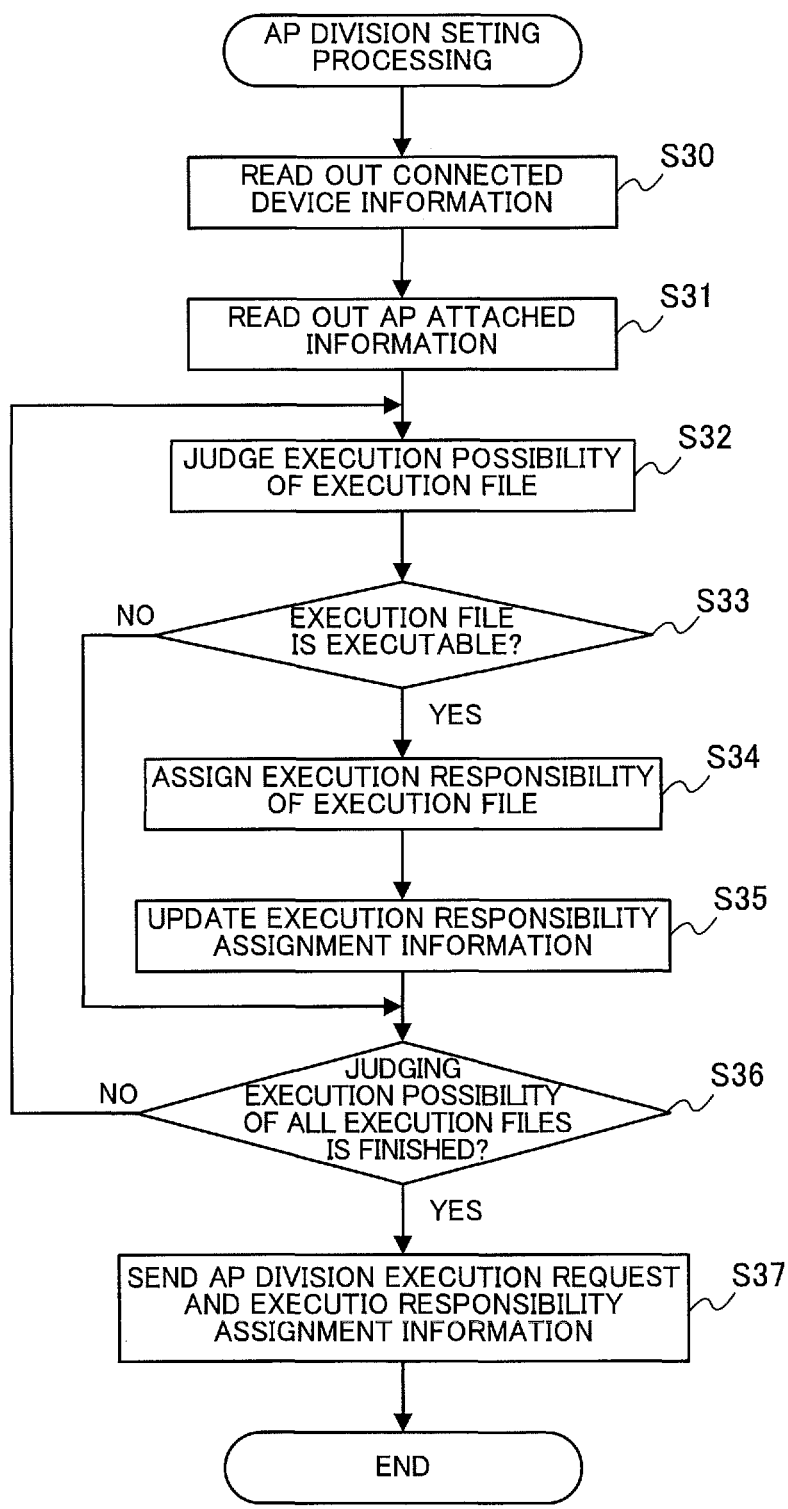
FIG. 8 is a flowchart indicating AP division setting processing in the embodiment 1.

FIG. 8 is a flowchart indicating the AP division setting processing performed in step S14 of FIG. 6.

When the AP division setting processing is started, the AP division setting part 132 reads out the connected device information 124 and the AP attached information 122 from the storage part 120 (S30, S31). At that time, the AP division setting part 132 generates the execution responsibility assignment information 125 in an initial state in which no execution responsibility for an execution file is assigned to an information processing device 110 and stores the generated execution responsibility assignment information 125 in the storage part 120.

Next, the AP division setting part 132 specifies, among the execution files stored in the AP attached information 122, one execution file for which it has not yet been judged whether it is executable, and judges whether the specified execution file is executable (S32). For example, in the case where the connected device information 124 read out in step S30 is the connected device information 124#1 shown in FIG. 9 and the AP attached information 122 read out in step S31 is the AP attached information 122#1 shown in FIG. 10, the number of the device IDs stored in the connected device information 124#1 is "4", and accordingly, among the execution files stored in the execution file name column 122#1*b* of the AP attached information 122#1, execution files satisfying the condition stored in the execution possibility judgment criterion device number column 122#1*c* of the AP attached information 122#1 are the first to seventh execution files. As a result, the AP division setting part 132 judges each of the first to seventh execution files to be executable and the eighth execution file to be non-executable. In the case where the specified execution file is judged to be executable (Yes in S33), the processing proceeds to step S34; in the case where the specified execution file is judged to be non-executable (No in S33), the processing proceeds to step S36.

In step S34, the AP division setting part 132 assigns the execution responsibility for the execution file that is judged to be executable to one of the information processing devices 110. For example, the AP division setting part 132 selects an information processing device 110 to execute the execution file judged to be executable among the information processing devices 110 identified by the device IDs stored in the connected device information 124, and assigns the execution responsibility for the execution file in question to the selected information processing device 110. For example, a method of assignment can be that in the case where execution files have been already assigned to the information processing devices 110, the AP division setting part 132 refers to the execution responsibility assignment information 125 to select preferentially an information processing device 110 that has been assigned fewer execution responsibilities, so that the processing loads of all the information processing devices 110 become even. In detail, the AP division setting part 132 selects an information processing device 110 in the order from the fewest number of assigned execution responsibilities, so that the number of assigned execution responsibilities becomes the same. In the case where the numbers of the assigned execution responsibilities are the same, the AP division setting part 132 may select any information processing device 110 among the information processing devices 110 having the same number of the assigned execution responsibilities, for example in the ascending order of the identification number stored in the No column 124*a* of the connected device information 124.

Further, in the case where no execution files have been yet assigned to the information processing devices 110, the AP division setting part 132 selects freely an information processing device 110 among the information processing devices 110 registered in the connected device information 124. In this case, the AP division setting part 132 can select any information processing device 110, for example by selecting in the ascending order of the identification numbers stored in the No column 124*a* of the connected device information 124.

Next, after the assignment of execution responsibility, the AP division setting part 132 updates the execution responsibility assignment information 125 by storing, in association with the specified execution file, the device ID of the information processing device 110 to which the execution responsibility is assigned (S35).

In step S36, the AP division setting part 132 judges whether the execution possibility judgment has been finished for all the execution files. In the case where there remains any execution file for which the execution possibility judgment has not been performed (No in S36), the processing proceeds to step S32; in the case where the execution possibility judgment has been performed for all the execution files (Yes in S36), the processing proceeds to step S37.

In step S37, the AP division setting part 132 causes the communication part 140 to send an AP division execution request together with the execution responsibility assignment information 125 to the information processing devices 110 identified by the device IDs registered in the connected device information 124. Then, the AP division setting processing is ended.

Figure 11:
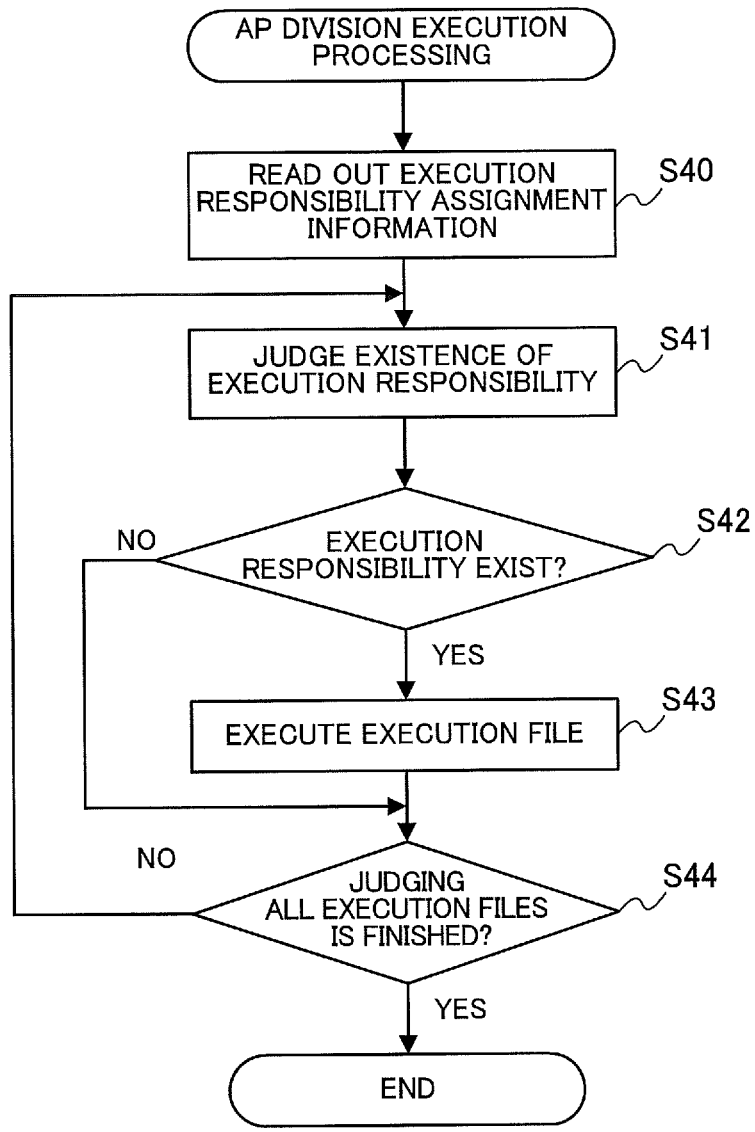
FIG. 11 is a flowchart indicating AP division execution processing in the embodiment 1.

FIG. 11 is a flowchart indicating the AP division execution processing performed in step S15 of FIG. 6.

When the AP division execution processing is started, the AP division execution part 133 reads out the execution responsibility assignment information 125 from the storage part 120 (S40).

Next, the AP division execution part 133 specifies one execution file for which judgment of existence of execution responsibility has not been performed yet among the execution files contained in the execution responsibility assignment information 125 read out, and judges whether the its own device has execution responsibility for the specified execution file (S41). For example, the AP division execution part 133 compares the device ID indicated by the device ID information 123 stored in the storage part 120 with the device ID associated with the execution file specified from the execution responsibility assignment information 125; and in the case where the device IDs coincide with each other, the AP division execution part 133 judges that the device has the execution responsibility for the specified execution file. For example, in the case where the execution responsibility assignment information 125 read out from the storage part 120 is the execution responsibility assignment information 125#1 shown in FIG. 12 and the device ID indicated by the device ID information 123 is 192.168.1.100, the AP division execution part 133 judges that the device has the execution responsibilities for the first and fifth execution files. In FIG. 12, as a device ID associated with the eighth execution file is not determined, no information processing device 110 has the execution responsibility for the eighth execution file.

In the case where the device has the execution responsibility for the specified execution file (Yes in S42), the processing proceeds to step S43; in the case where the device does not have the execution responsibility for the specified execution file (No in S42), the processing proceeds to step S44.

In step S43, the AP division execution part 133 obtains the specified execution file from the AP 121 in the storage part 120 and executes the execution file. Then, the processing proceeds to step S44.

In step S44, the AP division execution part 133 judges whether judgement of existence of execution responsibility has been finished for all the execution files contained in the execution responsibility assignment information 125 read out. In the case where there remains any execution file for which judgment of existence of execution responsibility has not been made (No in S44), the processing proceeds to step S41; in the case where judgment of existence of execution responsibility has been finished for all the execution files (Yes in S44), the AP division execution processing is ended.

Figure 13:
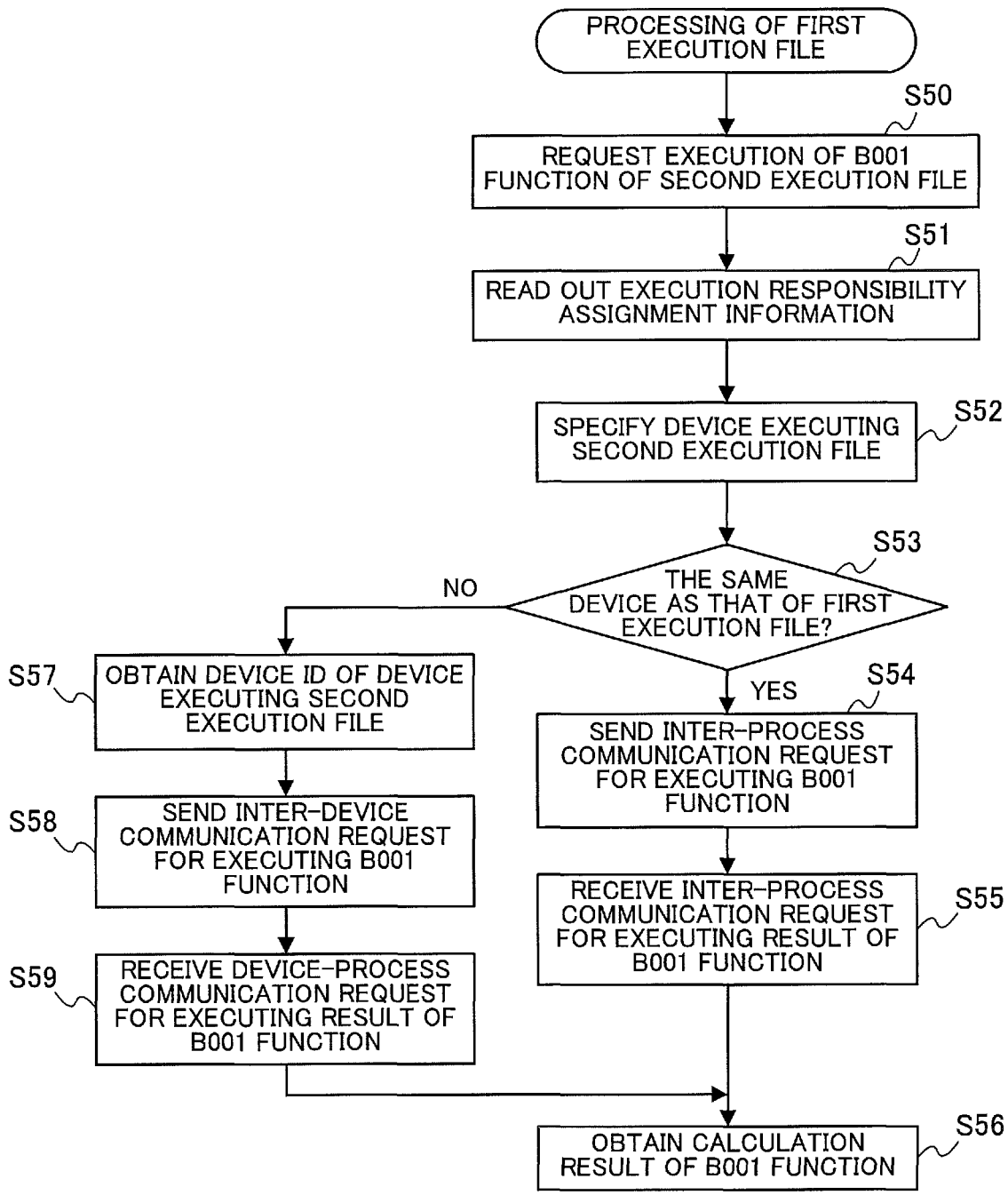
FIG. 13 is a flowchart indicating processing a first execution file in the embodiment 1.
Figure 14:
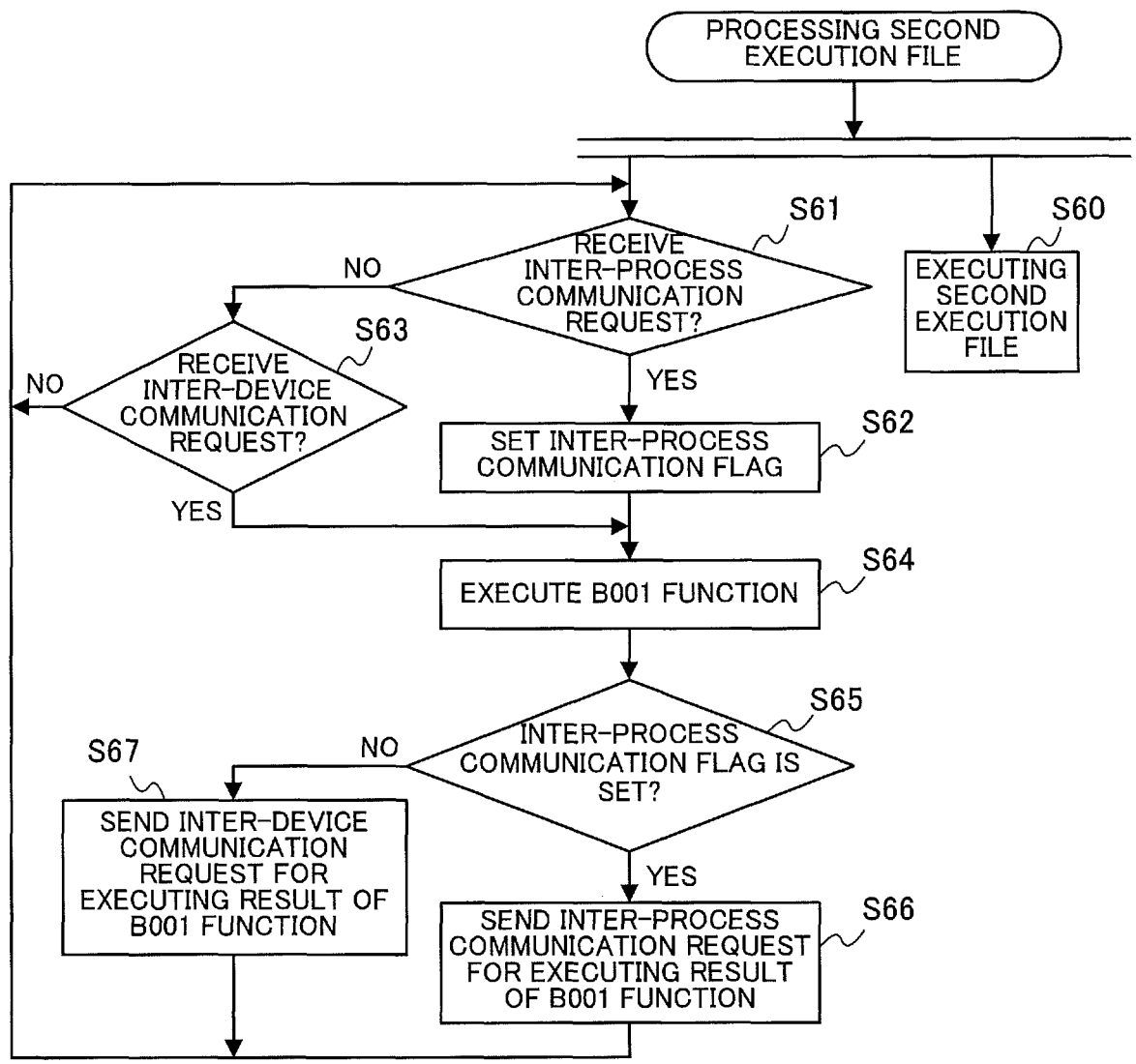
FIG. 14 is a flowchart indicating processing a second execution file in the embodiment 1.

Referring to FIGS. 13 and 14, inter-execution-file communication processing by the AP I/F control part 134 will be described. Here, although processing of communication between the first execution file and the second execution file is cited as an example, all the execution files can communicate with one another through similar communication processing.

FIG. 13 is a flowchart indicating processing of the first execution file.

In processing the first execution file, the AP division execution part 133 requests execution of, for example, a B001 function of the second execution file (S50).

In this case, the AP I/F control part 134 reads out the device ID information 123 and the execution responsibility assignment information 125 from the storage part 120 (S51).

Next, the AP I/F control part 134 refers to the device ID information 123 and the execution responsibility assignment information 125, which have been read out, to judge whether its own device has execution responsibility for the second execution file (S52). For example, the AP I/F control part 134 compares the device ID indicated by the device ID information 123 with the device ID associated with the second execution file obtained from the execution responsibility assignment information 125; and in the case where the device IDs coincide with each other, the AP I/F control part 134 judges that the device having the execution responsibility for the second execution file is the same as the device having the execution responsibility for the first execution file, or in other words that its own device has the execution responsibility for the second execution file. In the case where its own device has the execution responsibility for the second execution file (Yes in S53), the processing proceeds to step S54; in the case where another information processing device 110 has the execution responsibility for the second execution file (No in S53), the processing proceeds to step S57.

In step S54, the AP I/F control part 134 sends a request for execution of the B001 function via the inter-process communication part 135 (S54).

When the request for execution of the B001 function is sent in step S54, the AP I/F control part 134 enters a state of awaiting a calculation result of the B001 function; and when the B001 function of the second execution file is performed, the AP I/F control part 134 receives a value as the calculation result of the B001 function via the inter-process communication part 135 (S55).

The AP I/F control part 134 gives the AP division execution part 133 the calculation result of the B001 function received from the inter-process communication part 135 and thereby the AP division execution part 133 obtains the calculation result of the B001 function (S56).

When it is judged in step S53 that another information processing device 110 has the execution responsibility for the second execution file (No in S53), the processing proceeds to step S57.

In step S57, the AP I/F control part 134 obtains the device ID associated with the second execution file from the execution responsibility assignment information 125.

Then, the AP I/F control part 134 makes the communication part 140 send an inter-device communication request, which is a request for execution of the B001 function, to the information processing device 110 having the execution responsibility for the second execution file via the inter-device communication part 136 (S58).

After the request for execution of the B001 function is sent, the AP I/F control part 134 enters a state of awaiting a calculation result of the B001 function; and when the B001 function of the second execution file is performed, the AP I/F control part 134 receives a value as the calculation result of the B001 function via the communication part 140 and the inter-device communication part 136 (S59). Then, the processing proceeds to step S56.

FIG. 14 is a flowchart indicating processing of the second execution file.

While the AP division execution part 133 is executing the second execution file (S60), the AP I/F control part 134 enters a state of awaiting a request for execution of the function from another execution file via the inter-process communication part 135 (S61) or a state of awaiting a request for execution of the function from another execution file via the communication part 140 and the inter-device communication part 136 (S63).

When the AP I/F control part 134 receives a request for execution of the B001 function from the first execution file via the inter-process communication part 135 (Yes in S61), the processing proceeds to step S62.

In step S62, the AP I/F control part 134 sets an inter-process communication flag in the storage part 120.

Next, the AP/IF control part 134 makes the AP division execution part 133 execute the B001 function (S64). Then, the processing proceeds to step S65.

On the other hand, when the AP I/F control part 134 receives a request for execution of the B001 function from the first execution file via the communication part 140 and the inter-device communication part 136 (Yes in S63), the processing proceeds to step S64.

In step S65, the AP I/F control part 134 judges whether the inter-process communication flag is set. In the case where the inter-process communication flag is set (Yes in S65), the processing proceeds to step S66; in the case where the inter-process communication flag is not set (No in S65), the processing proceeds to S67.

In step S66, the AP I/F control part 134 sends the calculation result of the B001 function to the first execution file via the inter-process communication part 135.

On the other hand, in step S67, the AP I/F control part 134 makes the communication part 140 send the calculation result of the B001 function to the information processing device 110 having the execution responsibility for the first execution file via the inter-device communication part 136.

In the case where, in FIGS. 13 and 14, the information processing device 110 having the execution responsibility for the first execution file differs from the information processing device 110 having the execution responsibility for the second execution file, the information processing device 110 having the execution responsibility for the first execution file is also referred to as the first information processing device and the information processing device 110 having the execution responsibility for the second execution file is also referred to as the second information processing device.

Further, in the case where the information processing device 110 having the execution responsibility for the first execution file is the same as the information processing device 110 having the execution responsibility for the second execution file, the information processing device 110 having the execution responsibilities of the first and second execution files is also referred to as the first information processing device.

As described above, according to the embodiment 1, the information processing device 110 that is the master device assigns execution responsibilities for the execution files included in the AP to the information processing devices 110 connected to the LAN 101. Then, each information processing device 110 executes the assigned execution file only, so that the AP can be executed in a distributed manner without generating overhead of distributed processing. As a result, even in a device cooperation system having information processing devices 110 which are provided with low-performance CPUs, immediate response to an operation of a device and real-time display of information can be attained.

Further, in the case where the number of the information processing devices 110 connected to the LAN 101 is small, then by reducing the files to be executed, processing to be executed by each information processing device 110 is reduced and the CPU load can be reduced. Accordingly, even in the case of a device cooperation system having information processing devices 110 which are provided with low-performance CPUs, it is possible to implement a device cooperation system in which processing of the AP does not fail.

Embodiment 2

As shown in FIG. 1, an information processing system 200 according to an embodiment 2 has a plurality of information processing devices 210A to 210D. Here, when it is not necessary to differentiate each of the information processing devices 210A to 210D, each device is referred to as an information processing device 210.

Further, a hardware configuration of each information processing device 210 in the embodiment 2 is the same as the hardware configuration of each information processing device 110 of the embodiment 1 shown in FIG. 1.

Figure 15:
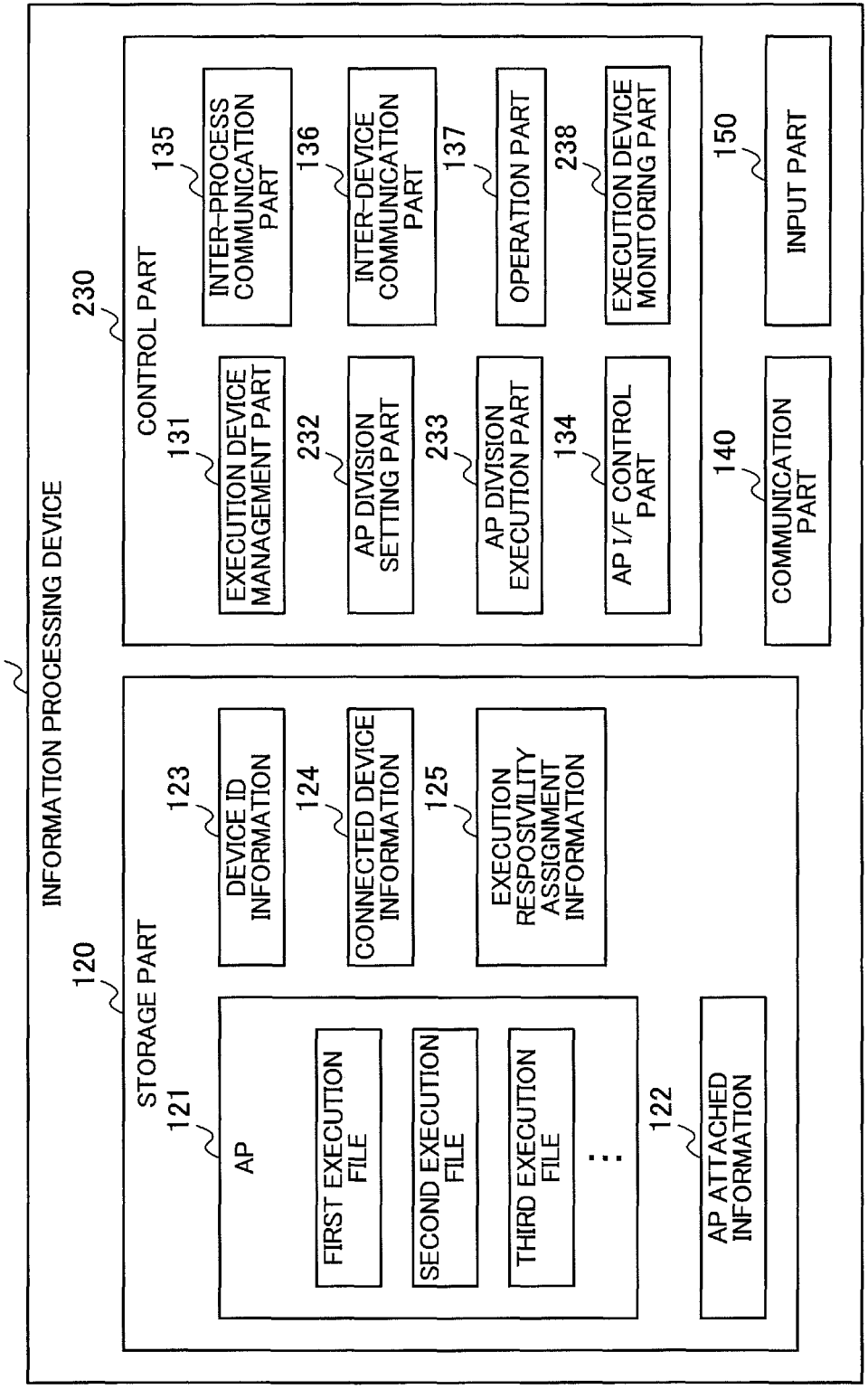
FIG. 15 is a block diagram illustrating schematically a functional configuration of an information processing device in an embodiment 2.

FIG. 15 is a block diagram illustrating schematically a functional configuration of each information processing device 210 in the embodiment 2.

Each information processing device 210 has a storage part 120, a control part 230, a communication part 140, and an input part 150. The information processing device 210 in the embodiment 2 is constructed similarly to the information processing device 110 in the embodiment 1, except for the control part 230.

The control part 230 controls processing in the information processing device 210.

The control part 230 has an execution device management part 131, an AP division setting part 232, an AP division execution part 233, an AP I/F control part 134, an inter-process communication part 135, an inter-device communication part 136, an operation part 137, and an execution device monitoring part 238.

The control part 230 in the embodiment 2 is constructed similarly to the control part 130 in the embodiment 1, except for the AP division setting part 232, the AP division execution part 233, and the execution device monitoring part 238.

The AP division setting part 232 judges whether an execution file of an execution file name written in the AP attached information 122 is executable, and assigns execution responsibility for an execution file that is judged to be executable to an information processing device 210 registered in the connected device information 124. When an information processing device 210 is newly connected to the LAN 101 after the assignment of the execution responsibilities for the execution files to the information processing apparatus 210, the AP division setting part 232 in the embodiment 2 again assigns the execution responsibilities for the execution files.

The AP division execution part 233 refers to the execution responsibility assignment information 125, obtains the execution file whose execution responsibility is assigned to its own device from the flash memory 13, and executes the obtained execution file. When execution responsibility for an execution file is newly assigned during execution of the execution file assigned to its own device, the AP division execution part 233 in the embodiment 2 executes the newly-assigned execution file.

The execution device monitoring part 238 detects an information processing device 210 newly connected to the LAN 101 during execution of the AP, and obtains the unique device ID held by the newly-connected information processing device 210 to update the connected device information 124. This processing is performed by the execution device monitoring part 238 of the master device, which is the information processing device 210 that has received the AP activation setting start operation from a user.

FIG. 16 is a flowchart indicating a general processing procedure of the information processing device 210 in the embodiment 2.

Among the processes shown in FIG. 16, processes similar to processes shown in FIG. 6 are given the same reference characters as in FIG. 6.

In FIG. 16, the processes of steps S10 to S13 and steps S16 to S18 are similar to the processes given the same reference characters in FIG. 6.

However, after step S13, the processing proceeds to step S70, and after step S17, the processing proceeds to step S72.

In step S70, the AP division setting part 232 performs AP division setting processing. This processing will be described in detail by referring to FIG. 19.

Next, the execution device monitoring part 238 sets a master device flag in the storage part 120 (S71).

Next, the AP division execution part 233 performs AP division execution processing (S72). This processing will be described in detail by referring to FIG. 21.

Next, the execution device monitoring part 238 judges whether the master device flag is set in the storage part 120 (S73). In the case where the master device flag is set (Yes in S73), the processing proceeds to step S74; in the case where the master device flag is not set (No in S73), it is judged that the AP is under execution.

In step S74, the execution device monitoring part 238 performs execution device addition monitoring processing. When an information processing device 210 newly connected to the LAN 101 is detected in the execution device addition monitoring processing, the processing proceeds to step S70 and again the AP division setting processing is performed.

Figures 17, 18:
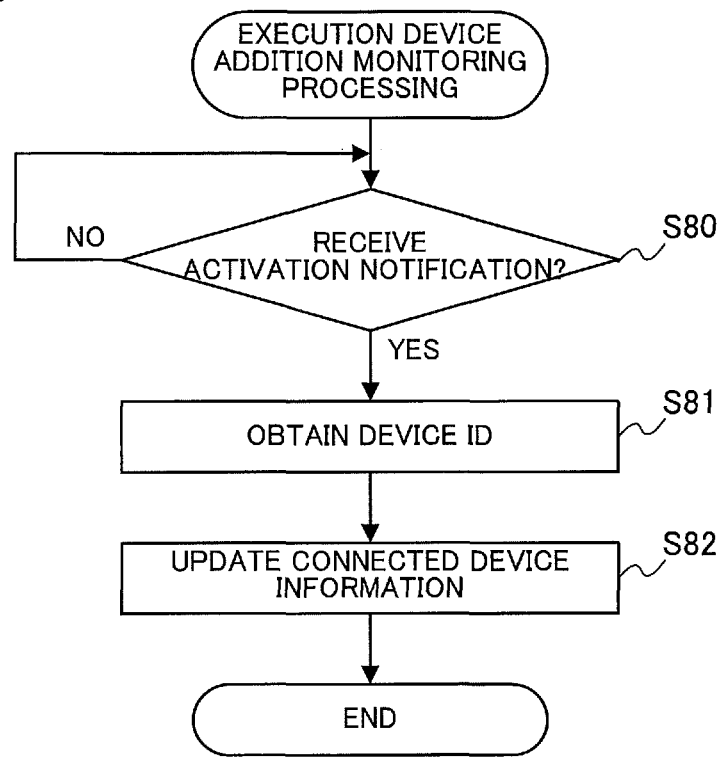
FIG. 17 is a flowchart indicating execution device addition monitoring processing in the embodiment 2.
FIG. 18 is a schematic diagram illustrating an example of connected device information in the embodiment 2.

FIG. 17 is a flowchart indicating the execution device addition monitoring processing performed in step S74 in FIG. 16.

When the execution device addition monitoring processing is started, the execution device monitoring part 238 checks whether the communication part 140 has received an activation notification sent from the information processing device 210 at the time of activation (S80). In other words, the execution device monitoring part 238 checks whether an activation notification is received after execution of the execution device management processing in step S13. By this processing, an information processing device 210 newly connected to the LAN 101 can be detected. In the case where an activation notification has been received (Yes in S80), the processing proceeds to step S81.

In step S81, the execution device monitoring part 238 obtains a device ID sent together with the activation notification.

Next, the execution device monitoring part 238 updates the connected device information 124 by storing the obtained device ID in the connected device information 124 (S82). For example, when a device ID "192.168.1.104" of a newly-connected information processing device 210 is added to the connected device information 124#1 shown in FIG. 9, the connected device information 124#1 is updated to the connected device information 124#2 shown in FIG. 18.

Figure 19:
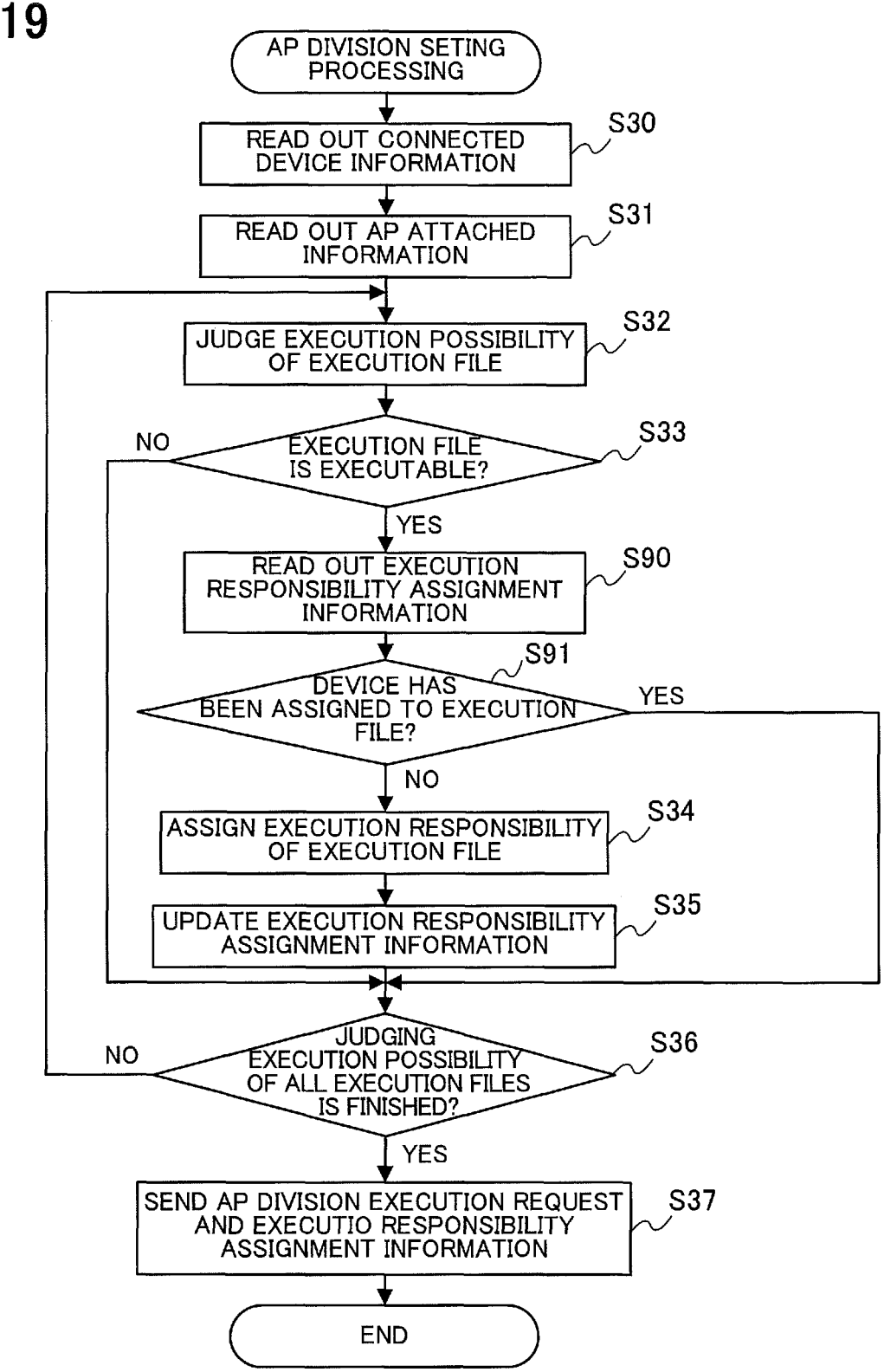
FIG. 19 is a flowchart indicating AP division setting processing in the embodiment 2.

FIG. 19 is a flowchart indicating the AP division setting processing performed in step S70 of FIG. 16.

Among the processes shown in FIG. 19, processes similar to processes shown in FIG. 8 are given the same reference characters as in FIG. 8.

In FIG. 19, the processes of steps S30 to S33 and steps S34 to S37 are similar to the processes given the same reference characters in FIG. 6.

However, after step S33, the processing proceeds to step S90.

In step S90, the AP division setting part 232 reads out the execution responsibility assignment information 125 from the storage part 120.

Next, the AP division setting part 232 judges whether execution responsibility for the specified execution file has been already assigned (S91). For example, in the case of the execution responsibility assignment information 125#1 shown in FIG. 12, the first to seventh execution files are judged to have been already assigned, while the eighth execution file is judged not to be assigned.

In the case where the execution responsibility has been already assigned (Yes in S91), the processing proceeds to step S36; in the case where the execution responsibility is not assigned, the processing proceeds to step S34. In step S34, the AP division setting part 232 assigns the execution responsibility for the specified execution file to one of the information processing devices 210 connected to the LAN 101. Here, the method of assignment is similar to that of the embodiment 1. For example, when the execution responsibility for the eighth execution file in the execution responsibility assignment information 125#1 shown in FIG. 12 is assigned, the execution responsibility assignment information 125#1 is updated to information such as the execution responsibility assignment information 125#2 shown in FIG. 20 (S35).

Figure 21:
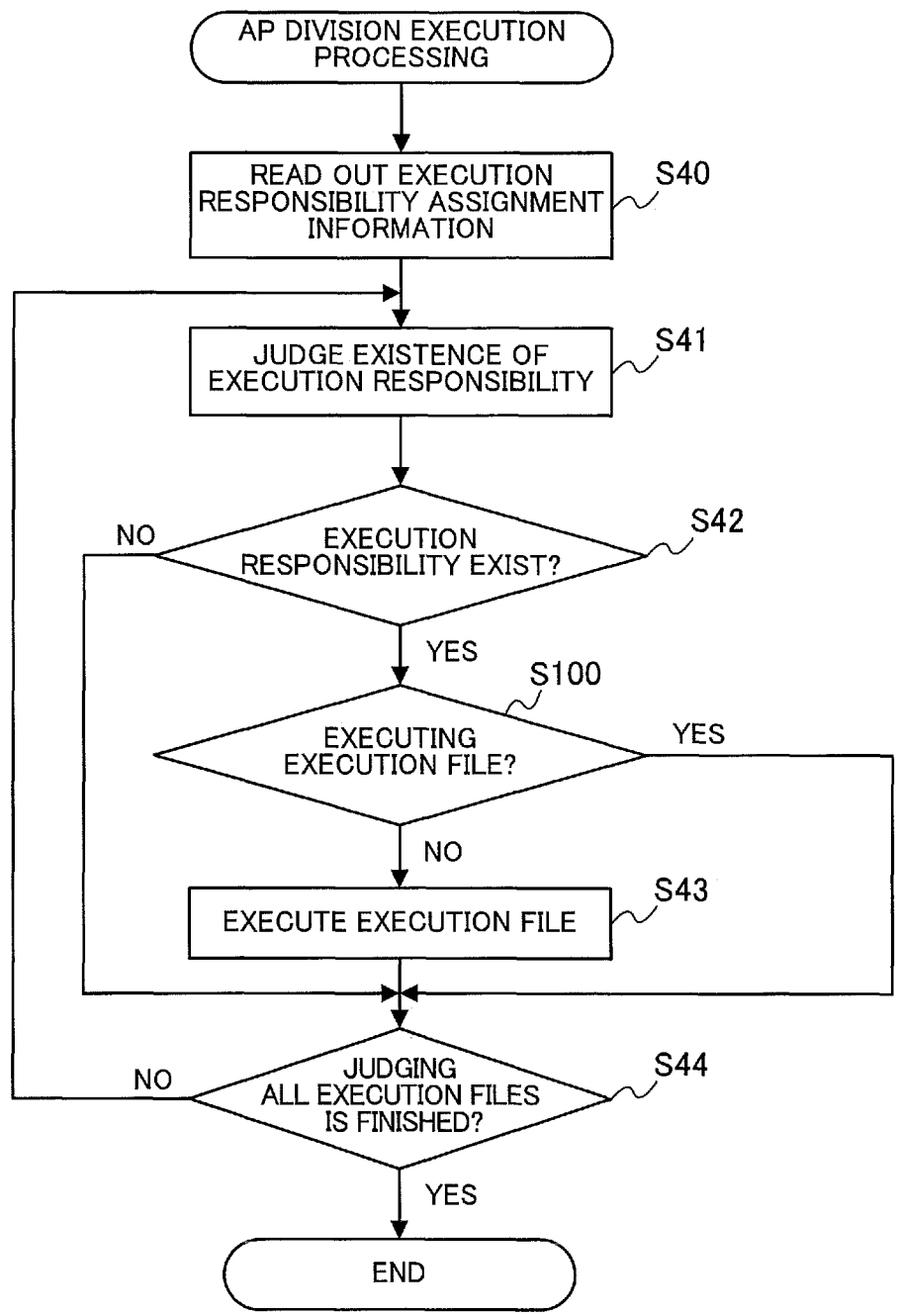
FIG. 21 is a flowchart indicating AP division execution processing in the embodiment 2.

FIG. 21 is a flowchart indicating the AP division execution processing performed in step S72 of FIG. 16.

Among the processes shown in FIG. 21, processes similar to processes shown in FIG. 11 are given the same reference characters as in FIG. 11.

In FIG. 21, the processes of steps S40 to S44 are similar to the processes given the same reference characters in FIG. 11.

However, in the case where it is judged in step S42 in FIG. 21 that the execution responsibility for the specified execution file is assigned to the device (Yes in S42), the processing proceeds to step S100.

In step S100, the AP division execution part 233 judges whether the specified execution file is already under execution. In the case where the specified execution file is already under execution (Yes in S100), the processing proceeds to step S44. In the case where the specified execution file is not under execution (No in S100), the processing proceeds to step S43.

In this way, in the case where an information processing device 210 newly connected to the LAN 101 is detected during operation of the AP, it is judged again whether the execution files are executable. When an execution file is judged to be executable, the execution responsibility for that execution file is assigned, and that execution file is executed. In other words, in the embodiment 2, in the case where an execution file satisfying the execution possibility judgment criterion device number exists as a result of connection of a new information processing device 210 to the LAN 101, the execution responsibility for this execution file is assigned to one of the information processing devices 210, so that the execution file is executed.

As described hereinabove, according to the embodiment 2, during operation of the AP, an information processing device 210 newly connected to the LAN 101 is detected, and an execution file that cannot be executed owing to a small number of the information processing devices 210 connected to the LAN 101 becomes executable afterward, and thereby convenience of user can be improved.

Embodiment 3

As shown in FIG. 1, an information processing system 300 according to an embodiment 3 has a plurality of information processing devices 310A to 310D. Here, when it is not necessary to differentiate each of the information processing devices 310A to 310D, each device is referred to as an information processing device 310.

Further, a hardware configuration of each information processing device 310 in the embodiment 3 is the same as the hardware configuration of each information processing device 110 of the embodiment 1 shown in FIG. 1.

Figure 22:
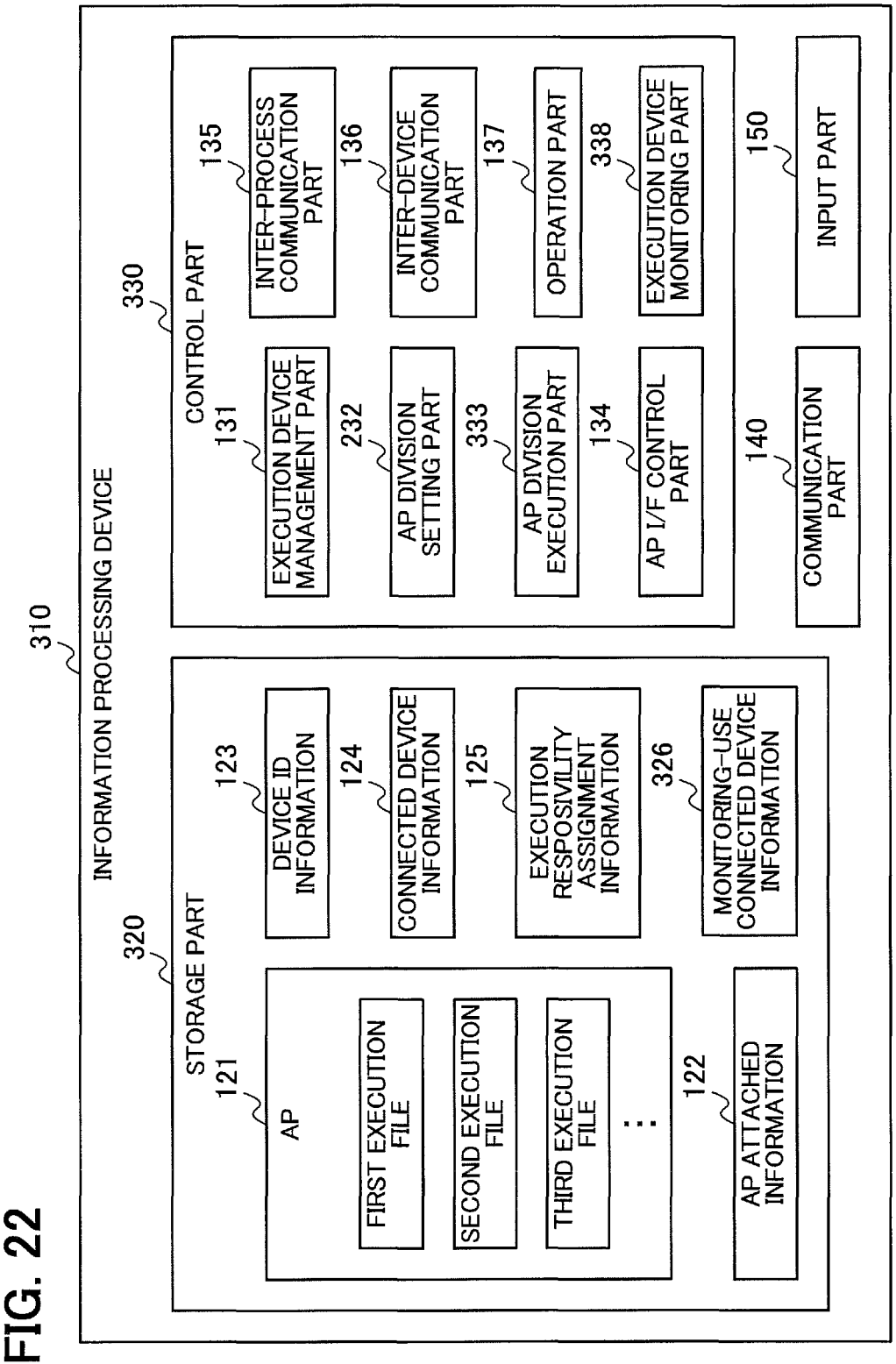
FIG. 22 is a block diagram illustrating schematically a functional configuration of an information processing device in an embodiment 3.

FIG. 22 is a block diagram illustrating schematically a functional configuration of each information processing device 310 in the embodiment 3.

Each information processing device 310 has a storage part 320, a control part 330, a communication part 140, and an input part 150. The information processing device 310 in the embodiment 3 is constructed similarly to the information processing device 110 in the embodiment 1, except for the storage part 320 and the control part 330.

The storage part 320 stores information and programs required for processing in the information processing device 310. For example, the storage part 320 stores an AP 121, AP attached information 122, device ID information 123, connected device information 124, execution responsibility assignment information 125, and monitoring-use connected device information 326.

The storage part 320 in the embodiment 3 stores information and programs similar to those stored in the storage part 120 in the embodiment 1, except for the monitoring-use connected device information 326.

The monitoring-use connected device information 326 indicates device IDs of the information processing devices 310 connected to the LAN 101.

FIG. 23 is a schematic diagram illustrating an example of the monitoring-use connected device information 326.

As shown in the figure, the monitoring-use connected device information 326 is information having a No column 326*a*, and a device ID column 326*b* in a table format.

The No column 326*a* stores an identification number for identifying each row contained in the monitoring-use connected device information 326.

The device ID column 326*b* stores a device ID of an information processing device 310 connected to the LAN 101.

The control part 330 controls processing in the information processing device 310.

The control part 330 has an execution device management part 131, an AP division setting part 232, an AP division execution part 333, an AP I/F control part 134, an inter-process communication part 135, an inter-device communication part 136, an operation part 137, and an execution device monitoring part 338.

The control part 330 in the embodiment 3 is constructed similarly to the control part 230 in the embodiment 2, except for the AP division execution part 333 and the execution device monitoring part 338. In other words, the AP division setting part 232 performs processing similar to the processing in the embodiment 2.

The execution device monitoring part 338 detects an information processing device 310 newly connected to the LAN 101 during execution of the AP, and obtains a unique device ID held by the newly-connected information processing device 310 to update the connected device information 124.

In such cases as it becomes impossible to have communication owing to occurrence of an error or the like, the execution device monitoring part 338 detects an information processing device 310 that becomes disconnected from the LAN 101, and updates the connected device information 124. Here, the execution device monitoring part 338 uses the monitoring-use connected device information 326 to update the connected device information 124.

This processing is performed by the execution device monitoring part 338 of the master device, which is the information processing device 310 that has received the AP activation setting start operation from a user.

The AP division execution part 333 refers to the execution responsibility assignment information 125, obtains the execution file whose execution responsibility is assigned to its own device from the flash memory 13, and executes the obtained execution file. When execution responsibility for an execution file is newly assigned during execution of the execution file assigned to its own device, the AP division execution part 333 in the embodiment 3 executes the newly-assigned execution file. Further, when assignment of execution responsibility to its own device is withdrawn, the AP division execution part 333 stops execution of the execution file whose assignment of the execution responsibility is withdrawn.

Figure 24:
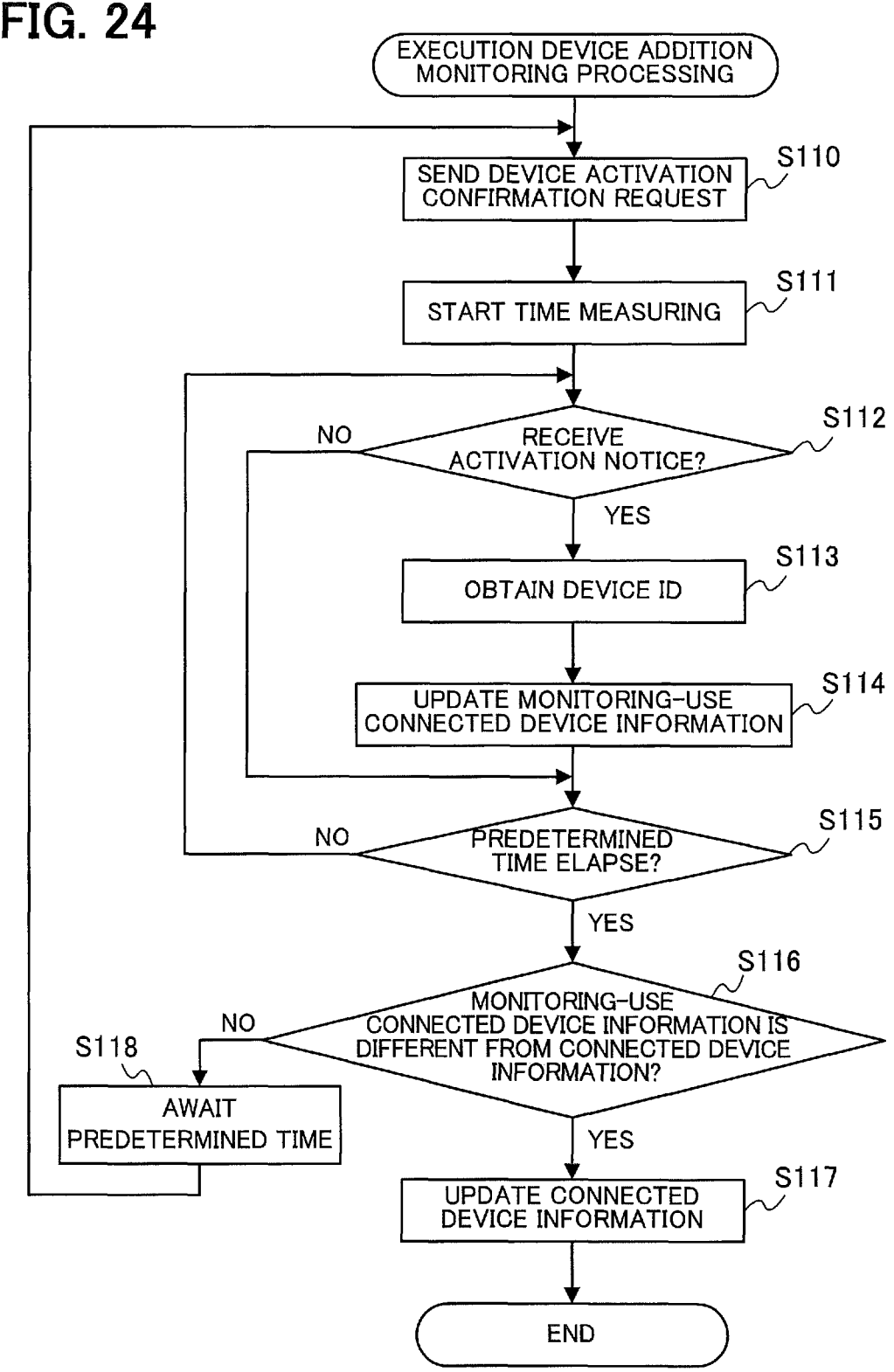
FIG. 24 is a flowchart indicating execution device addition monitoring processing of an execution device monitoring part in the embodiment 3.

FIG. 24 is a flowchart indicating execution device addition monitoring processing of the execution device monitoring part 338 in the embodiment 3.

When the execution device addition monitoring processing is started, the execution device monitoring part 338 causes the communication part 140 to send a device activation confirmation request to the information processing devices 310 connected to the LAN 101 by use of a multiple-address-notification means such as a multicast or the like (S110). Here, in the case where the monitoring-use connected device information 326 is stored in the storage part 320, the execution device monitoring part 338 initializes the monitoring-use connected device information 326 to delete all the rows and then stores the device ID of its own device, which is indicated by the device ID information 123, in the monitoring-use connected device information 326. In the case where the monitoring-use connected device information 326 is not stored in the storage part 320, the execution device monitoring part 338 generates monitoring-use connected device information 326 that stores the device ID of its own device indicated by the device ID information 123, and stores the generated monitoring-use connected device information 326 in the storage part 320.

Next, the execution device monitoring part 338 starts time measuring (S111).

Next, the execution device monitoring part 338 checks whether the communication part 140 has received an activation notice sent by an information processing device 310 at the time of activation (S112). In the case where an activation notice has been received (Yes in S112), the processing proceeds to step S113. In the case where an activation notice has not been received (No in S112), the processing proceeds to step S115.

In step S113, the execution device monitoring part 338 obtains a device ID sent together with the activation notice.

Next, the execution device monitoring part 338 updates the monitoring-use connected device information 326 by storing the obtained device ID in the monitoring-use connected device information 326 (S114).

Next, the execution device monitoring part 338 judges whether a predetermined time has elapsed from the start of measuring in step S111 (S115). In the case where the predetermined time has elapsed (Yes in S115), the processing proceeds to step S116; in the case where the predetermined time has not elapsed (No in S115), the processing proceeds to step S112.

In step S116, the execution device monitoring part 338 compares the monitoring-use connected device information 326 with the connected device information 124, to judge whether there is a difference. For example, by comparing the monitoring-use connected device information 326 shown in FIG. 23 with the connected device information 124#1 shown in FIG. 9, it is found that the device ID "192.168.1.104" is added and the device ID "192.168.1.102" and the device ID "192.168.1.103" are deleted.

In step S117, since there is a difference between the monitoring-use connected device information 326 and the connected device information 124, the execution device monitoring part 338 updates the connected device information 124 so that it may coincide with the monitoring-use connected device information 326. Then, the execution device addition monitoring processing is ended.

In step S118, the execution device monitoring part 338 awaits the elapse of a predetermined time. Then, the processing proceeds to step S110.

Thus, the execution device monitoring part 338 performs the execution device addition monitoring processing at intervals of the predetermined time, to detect addition and deletion of a device ID of an information processing device 310.

Figure 25:
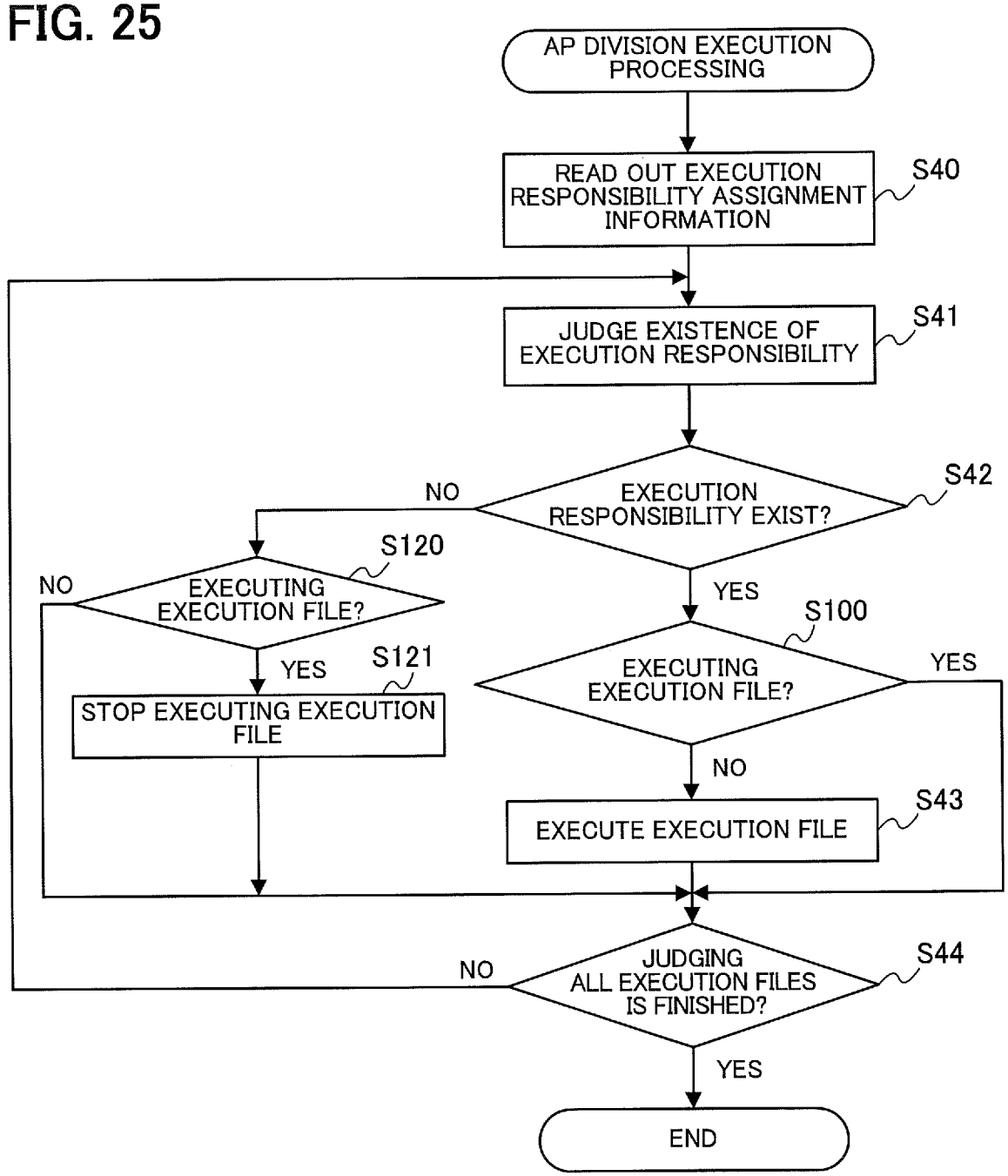
FIG. 25 is a flowchart indicating AP division execution processing in the embodiment 3.

FIG. 25 is a flowchart indicating AP division execution processing performed by the AP division execution part 333 in the embodiment 3.

Among the processes shown in FIG. 25, processes similar to processes shown in FIG. 21 are given the same reference characters as in FIG. 21.

In FIG. 25, the processes of steps S40 to S44 and step S100 are similar to the processes given the same reference characters in FIG. 21.

However, when it is judged in step S42 that there is not the execution responsibility for the specified execution file (No in step S42), the processing proceeds to step S120.

In step S120, the AP division execution part 333 judges whether the specified execution file is being executed. In the case where the specified execution file is being executed (Yes in step S120), the processing proceeds to step S121; in the case where the specified execution file is not being executed (No in step S120), the processing proceeds to step S44.

In step S121, the AP division execution part 333 stops execution of the specified execution file. Then, the processing proceeds to step S44.

For example, in the case where the execution device monitoring part 338 has updated the connected device information 124 so that the connected device information 124#2 shown in FIG. 18 becomes the same as the monitoring-use connected device information 326 shown in FIG. 23, the AP division setting part 232 updates the execution responsibility assignment information 125#2 shown in FIG. 20 into the execution responsibility assignment information 125#3 shown in FIG. 26.

In such a case, the information processing device 310 identified by the device ID 192.168.1.100 stops execution of the fifth execution file while keeping the first execution file under execution, and executes the fourth execution file. The information processing device 310 identified by the device ID 192.168.1.102 stops execution of the third and seventh execution files, and executes the second and fifth execution files. The information processing device 310 identified by the device ID 192.168.1.104 stops execution of the eighth execution file, and executes the third and sixth execution files.

In this way, when an information processing device 310 that is newly connected to the LAN 101 or an information processing device 310 that is disconnected from the LAN 101 is detected during execution of the AP, assignment of the execution responsibilities for the execution files is performed again.

As described above, according to the embodiment 3, when an information processing device that is newly connected to the LAN 101 or an information processing device that is disconnected from the LAN 101 is detected during execution of the AP, assignment of the execution responsibilities for the execution files to the information processing devices 310 connected to the LAN 101 is performed again each time, and thereby it is possible to implement a device cooperation system without causing failure of the AP.

Embodiment 4

Figure 27:
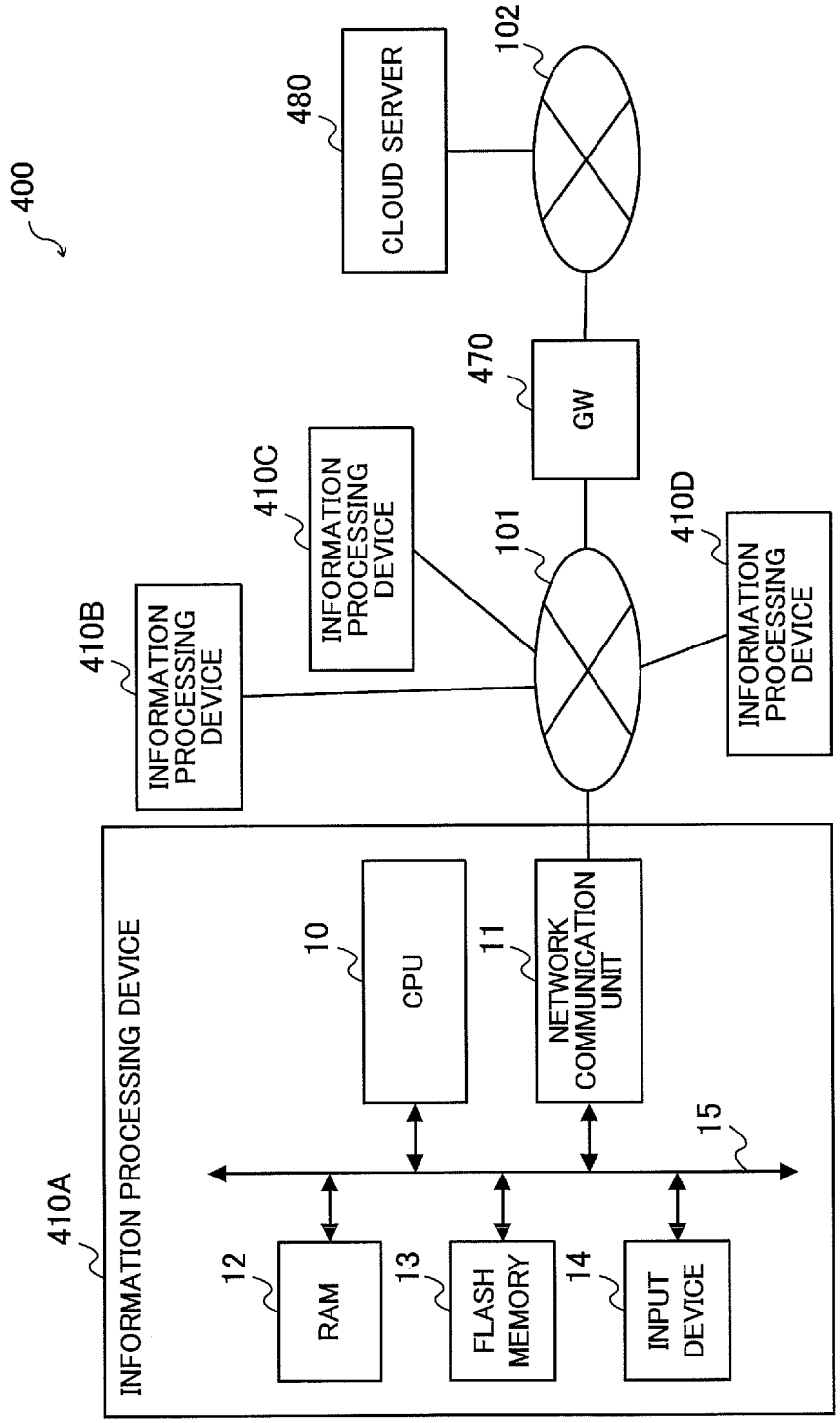
FIG. 27 is a schematic diagram illustrating an information processing system according to an embodiment 4.

FIG. 27 is a schematic diagram illustrating an information processing system 400 according to an embodiment 4.

The information processing system 400 has a plurality of information processing devices 410A to 410D, a gateway (hereinafter referred to as GW) 470, and a cloud server 480. Here, when it is not necessary to differentiate each of the information processing devices 410A to 410D, each device is referred to as an information processing device 410. The information processing devices 410 are connected to a LAN 101 as a network, so that data communication can be performed between the plurality of information processing devices 410.

A hardware configuration of each information processing device 410 in the embodiment 4 is the same as the hardware configuration of each information processing device 110 of the embodiment 1.

The GW 470 is connected to the LAN 101 and the Internet 102, and performs protocol conversion between the LAN 101 and the Internet 102. Owing to this, each information processing device 410 can communicate with the cloud server 480 via the GW 470.

The cloud server 480 is connected to the Internet 102, and each information processing device 410 can receive information and programs from the cloud server 480 via the LAN 101, the GW 470, and the Internet 102.

Figure 28:
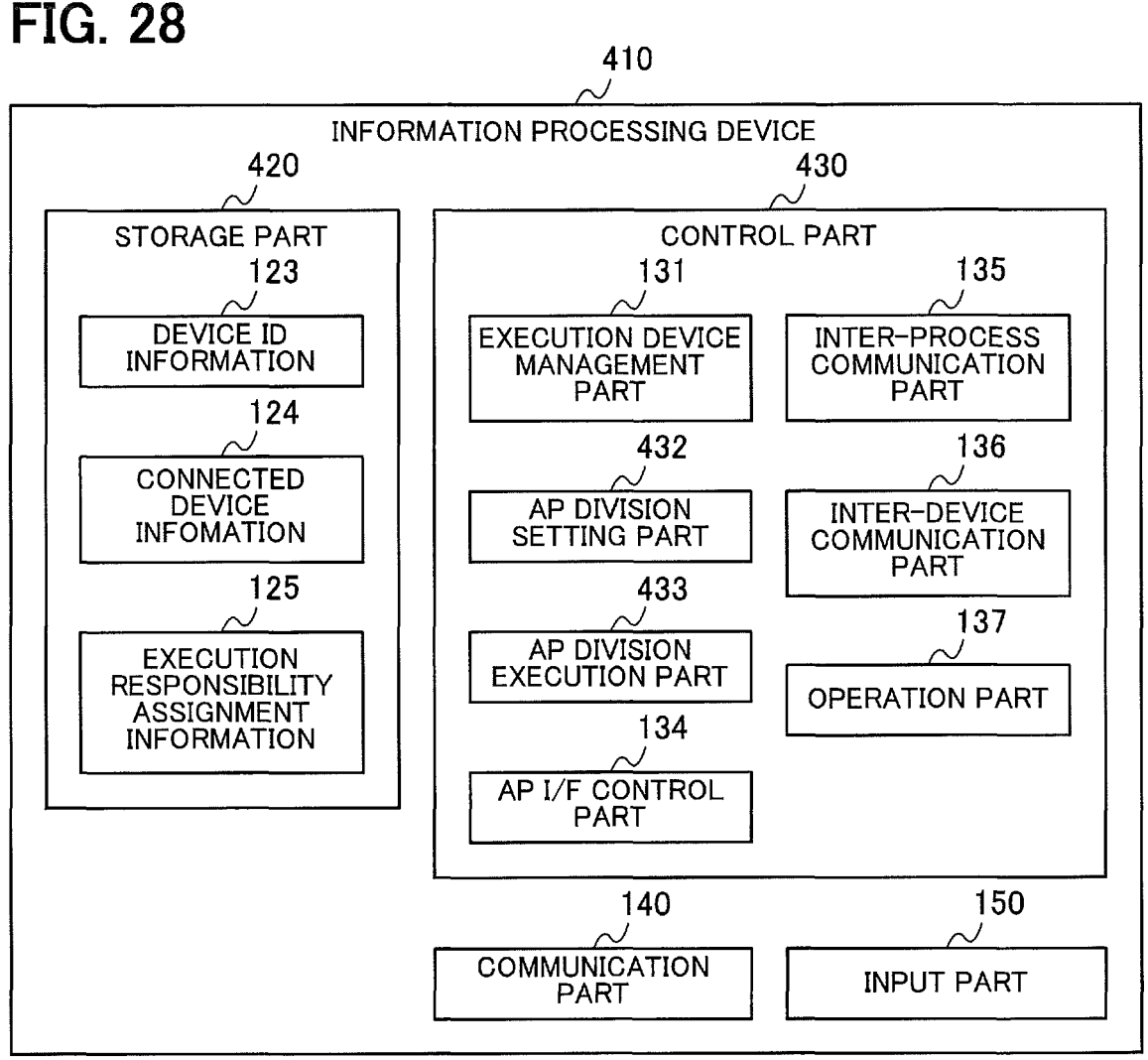
FIG. 28 is a block diagram illustrating schematically a functional configuration of an information processing device in the embodiment 4.

FIG. 28 is a block diagram illustrating schematically a functional configuration of each information processing device 410 in the embodiment 4.

Each information processing device 410 has a storage part 420, a control part 430, a communication part 140, and an input part 150.

The information processing device 410 in the embodiment 4 is constructed similarly to the information processing device 110 in the embodiment 1, except for the storage part 420 and the control part 430.

The storage part 420 stores information and programs required for processing in the information processing device 410. For example, the storage part 420 stores device ID information 123, connected device information 124, and execution responsibility assignment information 125. Each of these items of the information is similar to the corresponding item of the information in the embodiment 1.

The storage part 420 in the embodiment 4 does not store the AP 121 and the AP attached information 122 that are previously stored in the case of the embodiment 1. In the embodiment 4, these are obtained from the cloud server 480.

The control part 430 controls processing in the information processing device 410.

The control part 430 has an execution device management part 131, an AP division setting part 432, an AP division execution part 433, an AP I/F control part 134, an inter-process communication part 135, an inter-device communication part 136, and an operation part 137.

The control part 430 in the embodiment 4 is constructed similarly to the control part 130 in the embodiment 1, except for the AP division setting part 432 and the AP division execution part 433.

The AP division setting part 432 obtains AP attached information from a predetermined place in the cloud server 480 via the communication part 140. The obtained AP attached information is stored in the storage part 420.

FIG. 29 is a schematic diagram illustrating an example of the AP attached information in the embodiment 4.

As shown in the figure, the AP attached information 422 is information having a No column 422a, an execution file name column 422b, a location column 422c, and an execution possibility judgment criterion device number column 422d in a table format. Information stored in the No column 422a, the execution file name column 422b, and the execution possibility judgment criterion device number column 422d is similar to the information stored in the corresponding columns of the AP attached information 122 in the embodiment 1.

The location column 422c stores information indicating a location of an execution file. Here, the location column 422c stores a Uniform Resource Locator (URL).

As described above, the AP attached information 422 in the embodiment 4 is information indicating the execution files included in the AP, locations of the execution files, and execution conditions for executing the execution files.

Returning to FIG. 28, the AP division setting part 432 judges whether each of the execution files having the execution file names written in the AP attached information 422 is executable, and assigns execution responsibility for an execution file that is judged to be executable to an information processing device 410 registered in the connected device information 124. Then, the AP division setting part 432 generates the execution responsibility assignment information 125, and stores the generated execution responsibility assignment information 125 in the storage part 420.

The AP division execution part 433 refers to the execution responsibility assignment information 125 and the AP attached information 422, and obtains the execution file assigned to its own device from the cloud server 480 indicated by the location corresponding to the execution file in question. The obtained execution file is stored in the storage part 420 and executed.

As described above, according to the embodiment 4, the execution files of the AP and the AP attached information 422 are obtained from the cloud server 480, and thereby it is possible to decrease the capacity of the flash memory 13.

Although in the embodiment 4, the AP division setting part 432 generates the execution responsibility assignment information 125 similar to that in the embodiment 1, processing in the AP division setting part 432 is not limited to such an example.

For example, it is possible that the AP division setting part 432 generates execution responsibility assignment information 425 as shown in FIG. 30 and stores the generated information in the storage part 420.

FIG. 30 is a schematic diagram illustrating an example of the execution responsibility assignment information 425.

As shown in the figure, the execution responsibility assignment information 425 is information having a No column 425a, an execution file name column 425b, a location column 425c, and a device ID column 425d in a table format. Information stored in the No column 425a, the execution file name column 425b, and the device ID column 425d is similar to the information stored in the corresponding columns of the execution responsibility assignment information 125 in the embodiment 1.

The location column 425c stores information indicating a location of an execution file.

In such an example, the execution responsibility assignment information 425 is information indicating, for each execution file, the location of the execution file and the information processing device 410 having the execution responsibility.

In such a case, the AP division execution part 433 refers to the execution responsibility assignment information 425, obtains the execution file assigned to its own device from the cloud server 480 indicated by the location corresponding to the execution file, and executes the execution file.

Embodiment 5

Figure 31:
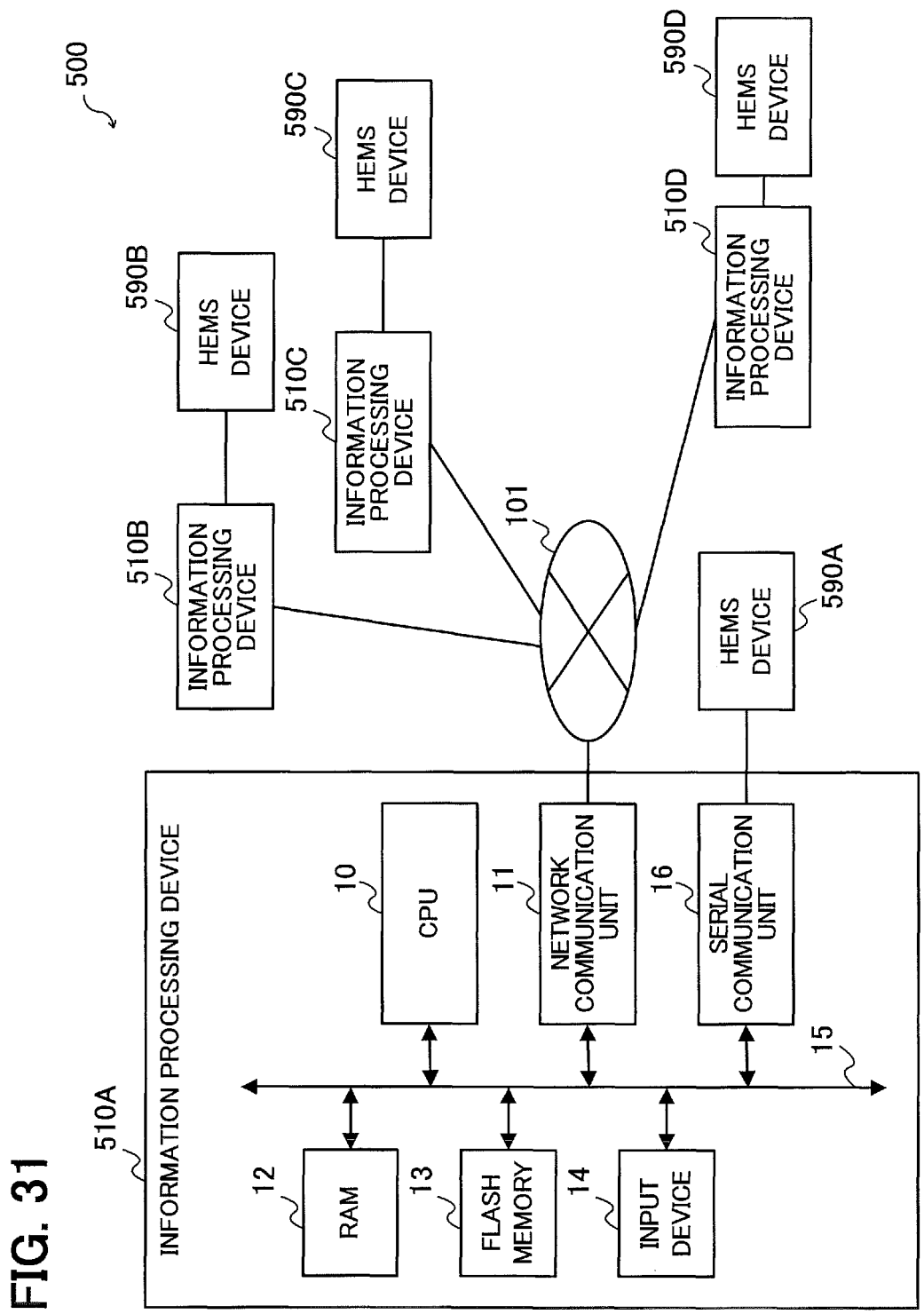
FIG. 31 is a schematic diagram illustrating an information processing system according to an embodiment 5.

FIG. 31 is a schematic diagram illustrating an information processing system 500 according to an embodiment 5.

The information processing system 500 has a plurality of information processing devices 510A to 510D and a plurality of HEMS devices 590A to 590D. Here, when it is not necessary to differentiate each of the information processing devices 510A to 510D, each device is referred to as an information processing device 510. The information processing devices 510 are connected to a LAN 101 as a network, so that data communication can be performed among the plurality of information processing devices 510. Further, when it is not necessary to differentiate each of the HEMS devices 590A to 590D, each device is referred to as a HEMS device 590.

A hardware configuration of each information processing device 510 in the embodiment 5 is the same as the hardware configuration of each information processing device 110 in the embodiment 1, except that a serial communication unit 16 is added.

The serial communication unit 16 performs serial communication with a HEMS device 590.

In other words, the information processing device 510 is connected to the HEMS device 590 via the serial communication unit 16. As for the connection form, the information processing device 510 may be built in to the HEMS device 590, or the HEMS device 590 may be externally provided with the information processing device 510.

Each of the HEMS devices 590A to 590D is, for example, a home electric appliance such as a home television, a refrigerator, or an IH cooking heater; or an air-conditioning device such as an air conditioner or a heat pump type water cooling and heating system device.

Figure 32:
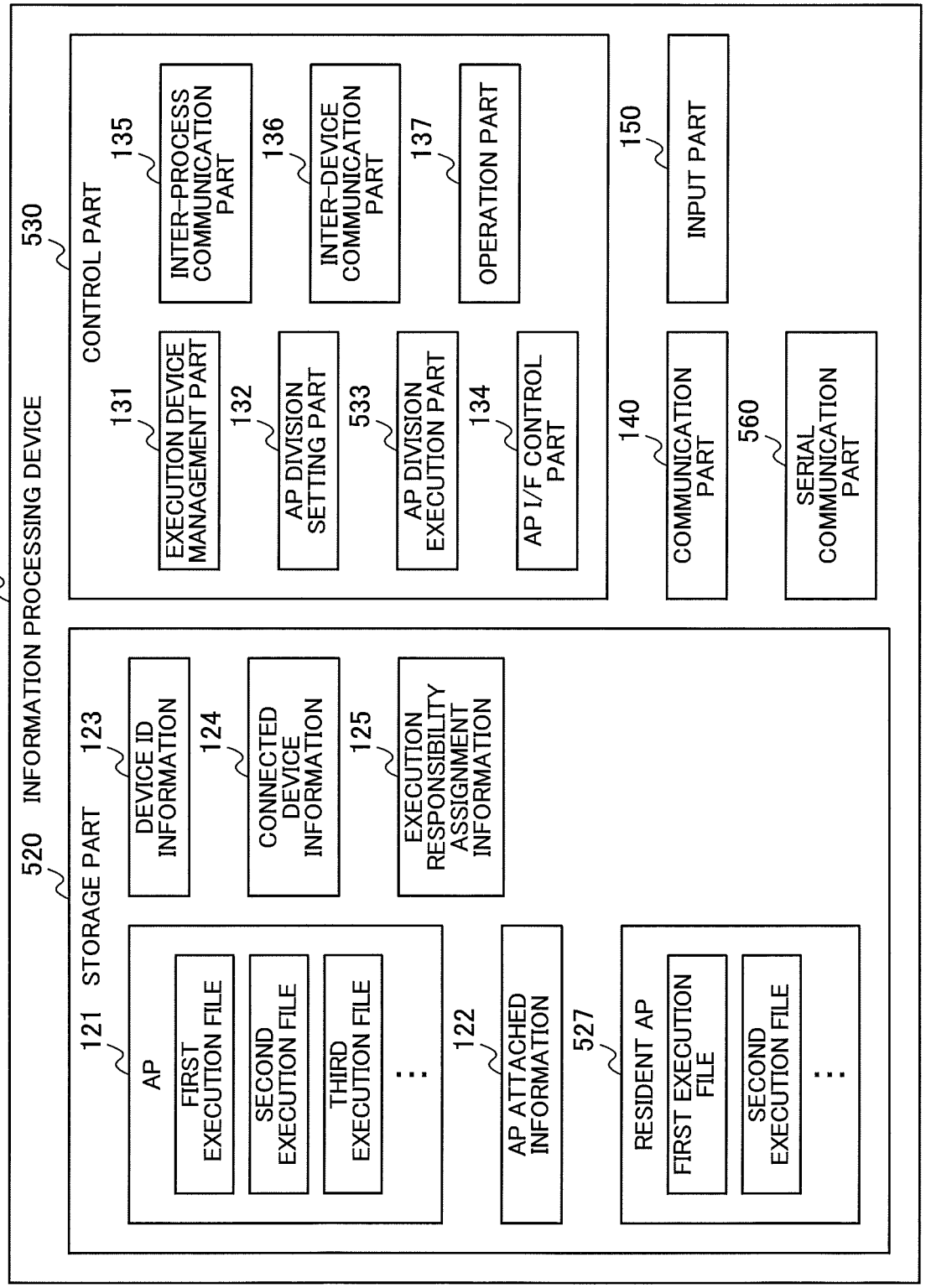
FIG. 32 is a block diagram illustrating schematically a functional configuration of an information processing device in the embodiment 5.

FIG. 32 is a block diagram illustrating schematically a functional configuration of each information processing device 510 in the embodiment 5.

Each information processing device 510 has a storage part 520, a control part 530, a communication part 140, an input part 150, and a serial communication part 560. The information processing device 510 in the embodiment 5 is constructed similarly to the information processing device 110 in the embodiment 1, except for the storage part 520, the control part 530, and the serial communication part 560.

The storage part 520 stores information and programs required for processing in the information processing device 510. For example, the storage part 520 stores an AP 121, AP attached information 122, device ID information 123, connected device information 124, execution responsibility assignment information 125, and a resident AP 527.

The storage part 520 in the embodiment 5 stores information and programs similar to those stored in the storage part 120 in the embodiment 1, except for the resident AP 527.

The resident AP 527 has one or more execution files, and the information processing device 510 invariably executes the resident AP 527 stored in the storage part 520. In other words, the resident AP 527 is an application that is not executed in a distributed manner. For example, the resident AP 527 is an execution file that implements a unique function of the information processing device 510 or a control function for the HEMS device 590 connected via the serial communication unit 16.

The control part 530 controls processing in the information processing device 510.

The control part 530 has an execution device management part 131, an AP division setting part 132, an AP division execution part 533, an AP I/F control part 134, an inter-process communication part 135, an inter-device communication part 136, and an operation part 137.

The control part 530 in the embodiment 5 is constructed similarly to the control part 130 in the embodiment 1, except for the AP division execution part 533.

The AP division execution part 533 obtains the execution file of the resident AP 527 from the flash memory 13 and executes the obtained execution file, in addition to performing processing similar to the processing in the embodiment 1.

The serial communication unit 560 performs serial communication with the HEMS device 590 so as to send and receive information.

Next, referring to FIG. 33, operations of executing the AP 121 and the resident AP 527 by the information processing devices 510 in the embodiment 5 will be described taking a heat pump type water cooling and heating system as an example.

Figure 33:
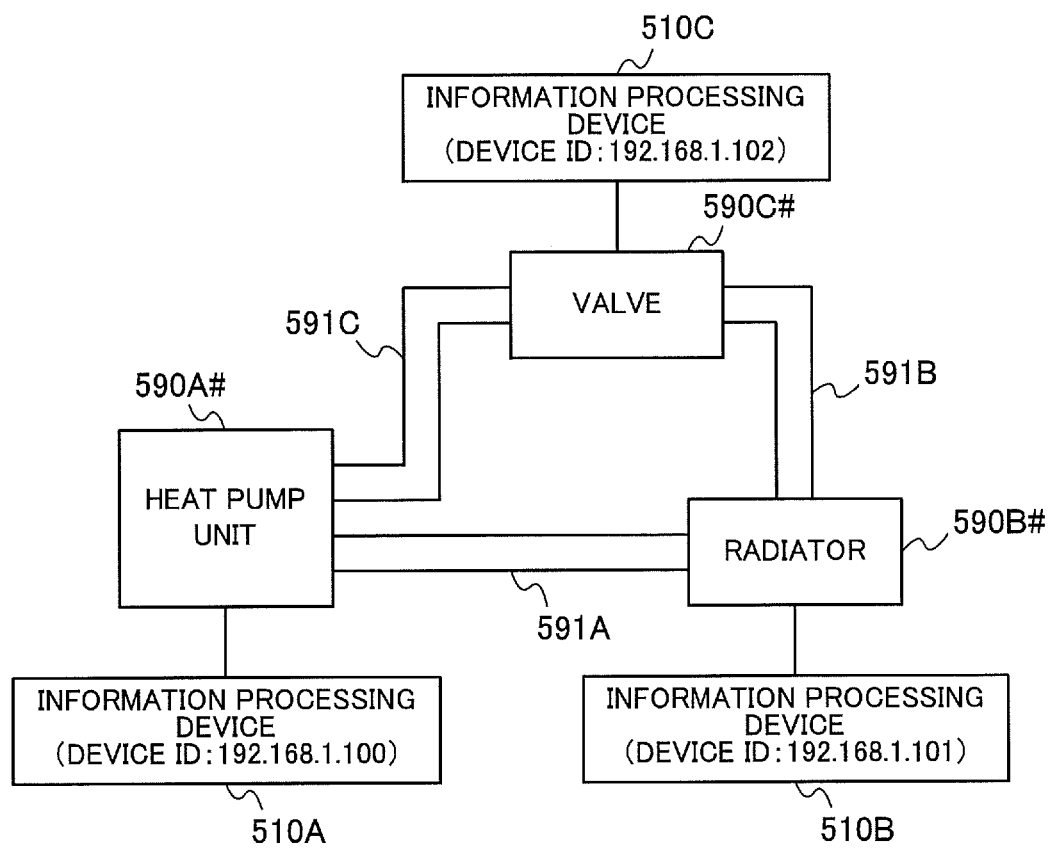
FIG. 33 is a schematic diagram illustrating an example of system configuration in which the information processing device in the embodiment 5 is applied to a heat pump type water cooling and heating system.

FIG. 33 is a schematic diagram illustrating an example of system configuration in which the information processing device 510 is applied to a heat pump type water cooling and heating system.

As HEMS devices 590 included in the heat pump type water cooling and heating system, there are a heat pump unit 590A# for heating water and supplying hot water, a radiator 590B# for radiating heat, and a valve 590C# for controlling a water flow rate. Each of these HEMS devices 590 is connected to one of the information processing devices 510. Here, the heat pump unit 590A#, the radiator 590B#, and the valve 590C# are linked with one another through pipes 591A to 591C.

It is assumed that a room temperature optimum control AP of the heat pump type water cooling and heating system has execution files indicated by AP attached information 122#5 shown in FIG. 34. The AP division setting part 132 assigns each of the execution responsibilities for the execution files to the information processing devices 510A to 510C, and, for example, execution responsibility assignment information 125#5 shown in FIG. 35 is generated.

The resident AP 527 of the information processing device 510A is, for example, an execution file for obtaining temperature information of the heat pump unit 590A# and for setting temperature of the heat pump unit 590A#. The resident AP 527 of the information processing device 510B is, for example, an execution file for setting an operation mode of the radiator 590B#. The resident AP 527 of the information processing device 510C is, for example, an execution file for obtaining temperature information of the valve 590C# and for opening and closing the valve.

Operations of executing the AP 121 and the resident APs 527 by the information processing devices 510 in the heat pump type water cooling and heating system are performed as follows.

The AP division execution part 533 of the information processing device 510A executes an execution file for a scheduling function, an execution file for a rescheduling function, and the execution file for obtaining the temperature information of the heat pump unit 590A# and for setting the temperature of the heat pump unit 590A#.

The AP division execution part 533 of the information processing device 510B executes an execution file for a hot/cool feeling characteristic estimation function and the execution file for changing the operation mode of the radiator 590B#.

The AP division execution part 533 of the information processing device 510C executes an execution file for a set-temperature control function and the execution file for obtaining the temperature information of the valve 590C# and for opening and closing the valve.

As described above, according to the embodiment 5, each information processing device 510 executes the execution file for controlling the HEMS device 590 connected to itself, and thereby it is possible to control the specific HEMS device 590 even in the case where the AP 121 is executed in a distributed manner.

DESCRIPTION OF REFERENCE CHARACTERS

100, 200, 300, 400, 500: information processing system; 101: LAN; 102: Internet; 110, 210, 310, 410, 510: information processing device; 10: CPU; 11: network communication unit; 12: RAM; 13: flash memory; 14: input device; 15: bus; 16: serial communication unit; 120, 320, 420, 520: storage part; 121: AP; 122, 422: AP attached information; 123: device ID information; 124: connected device information; 125, 425: execution responsibility assignment information; 326: monitoring-use connected device information; 527: resident AP; 130, 230, 430, 530: control part; 131: execution device management part; 132, 232, 432: AP division setting part; 133, 233, 333, 433, 533: AP division execution part; 134: AP I/F control part; 135: inter-process communication part; 136: inter-device communication part; 137: operation part; 238, 338: execution device monitoring part; 140: communication part; 150: input part; 560: serial communication part; 470: GW; 480: cloud server; and 590: HEMS device.

What is claimed is:

1. An information processing system comprising a plurality of information processing devices to execute an application including a plurality of execution files in a distributed manner through a network, a gateway to be connected to the network and Internet, and a cloud server to be connected to the Internet wherein, each of the plurality of information processing devices comprises:
an input part to receive input of an execution instruction of the application;
a receiving part;
a storage part;
an application division setting part, when the input part receives the input of the execution instruction, to receive application attached information indicating each of the plurality of execution files and a condition for executing each of the plurality of execution files, from the cloud server via the receiving part and the gateway, to cause the storage part to store the application attached information, to assign, to one of the plurality of information processing devices, execution responsibility for an execution file which satisfies the condition and is included in the plurality of execution files, and to generate first execution responsibility assignment information indicating each of the execution files and an information processing device to which the execution responsibility for each of the execution files is assigned when the information processing device functions as a master device in the plurality of information processing devices;
a sending part to send the first execution responsibility assignment information to the network;
an application division execution part to obtain the first execution responsibility assignment information when the information processing device functions as the master device or second execution responsibility assignment information from another information processing device in the plurality of information processing devices when the information processing device functions as a slave device in the plurality of information processing devices, the second execution responsibility assignment information being generated by the another information processing device and indicating each of the execution files and an information processing device to which the execution responsibility for each of the execution files is assigned, the application division execution part to refer to the first execution responsibility assignment information or the second execution responsibility assignment information to obtain an execution file whose execution responsibility is assigned to its own device out of the plurality of execution files, from the cloud server via the receiving part and the gateway, to cause the storage part to store the obtained execution file and to execute the obtained execution file; and an execution device monitoring part to detect whether one information processing device included in the plurality of information processing devices is newly connected to the network; wherein, the condition is a number of devices required for executing an execution file, the application division setting part judges that the condition is satisfied when a number of one or more information processing devices that are included in the plurality of information processing devices and connected to the network is larger than or equal to the number of the devices of the condition, wherein the first or second execution responsibility assignment information indicates at least one execution file is assigned to only one single information processing device when the corresponding condition of the at least one execution file is greater than one; and when the execution device monitoring part detects that the one information processing device is newly connected to the network, the application division setting part again assigns the execution responsibility for each of the plurality of execution files to one of the plurality of information processing devices.

2. The information processing system of claim 1, wherein:
each of the plurality of information processing devices further comprises an execution device monitoring part to detect whether one information processing device included in the plurality of information processing devices is disconnected from the network; and when the execution device monitoring part detects that the one information processing device is disconnected from the network, the application division setting part again assigns the execution responsibility for each of the plurality of execution files to one of the plurality of information processing devices.

3. The information processing system of claim 1, wherein:
execution responsibility for a first execution file included in the plurality of execution files is assigned to a first information processing device included in the plurality of information processing devices;

execution responsibility for a second execution file included in the plurality of execution files is assigned to a second information processing device included in the plurality of information processing devices;

when a calculation result of a function included in the second execution file is required for executing the first execution file, the sending part of the first information processing device sends an inter-device communication request for requesting the calculation result of the function to the network;

the receiving part of the second information processing device receives the inter-device communication request from the network;

the application division execution part of the second information processing device calculates a value by using the function in response to the inter-device communication request;

the sending part of the second information processing device sends the calculated value to the network; and the receiving part of the first information processing device receives the calculated value from the network and gives the calculated value to the application division execution part of the first information processing device.

4. The information processing system of claim 1, wherein:
a first execution file and a second execution file included in the plurality of execution files are assigned to a first information processing device included in the plurality of information processing devices;

when a calculation result of a function included in the second execution file is required for executing the first execution file, the application division execution part of the first information processing device calculates a value by using the function during execution of the first execution file.

5. The information processing system of claim 1, wherein:
each of the plurality of information processing devices further comprises an execution device management part, when the input part receives the input of the execution instruction, to detect an information processing device which is connected to the network and included in the plurality of information processing devices and to generate connected device information holding a device ID of the detected information processing device; and the application division setting part refers to the connected device information and the application attached information to generate the first execution responsibility assignment information.

6. An information processing device used as one of a plurality of information processing devices included in an information processing system comprising the plurality of information processing devices to execute an application including a plurality of execution files in a distributed manner through a network, a gateway to be connected to the network and Internet, and a cloud server to be connected to the Internet, the information processing device comprising:

an input part to receive input of an execution instruction of the application;

a receiving part;

a storage part;

an application division setting part, when the input part receives the input of the execution instruction, to receive application attached information indicating each of the plurality of execution files and a condition for executing each of the plurality of execution files, from the cloud server via the receiving part and the gateway, to cause the storage part to store the application attached information, to assign, to one of the plurality of information processing devices, execution responsibility for an execution file which satisfies the condition and is included in the plurality of execution files, and to generate first execution responsibility assignment information indicating each of the execution files and an information processing device to which the execution responsibility for each of the execution files is assigned when the information processing device functions as a master device in the plurality of information processing devices;

a sending part to send the first execution responsibility assignment information to the network;

an application division execution part to obtain the first execution responsibility assignment information when the information processing device functions as the master device or second execution responsibility assignment information from another information processing device in the plurality of information processing devices when the information processing device functions as a slave device in the plurality of information processing devices, the second execution responsibility assignment information being generated by the another information processing device and indicating each of the execution files and an information processing device to which the execution responsibility for each of the execution files is assigned, the application division execution part to refer to the first execution responsibility assignment information or the second execution responsibility assignment information to obtain an execution file whose execution responsibility is assigned to its own device out of the plurality of execution files, from the cloud server via the receiving part and the gateway, to cause the storage part to store the obtained execution file and to execute the obtained execution file; and an execution device monitoring part to detect whether one information processing device included in the plurality of information processing devices is newly connected to the network;

wherein, the condition is a number of devices required for executing an execution file, the application division setting part judges that the condition is satisfied when a number of one or more information processing devices that are included in the plurality of information processing devices and connected to the network is larger than or equal to the number of the devices of the condition, wherein the first or second execution responsibility assignment information indicates at least one execution file is assigned to only one single information processing device when the corresponding condition of the at least one execution file is greater than one; and when the execution device monitoring part detects that the one information processing device is newly connected to the network, the application division setting part again assigns the execution responsibility for each of the plurality of execution files to one of the plurality of information processing devices.

7. An information processing method performed by an information processing device used as one of a plurality of information processing devices included in an information processing system comprising the plurality of information processing devices to execute an application including a plurality of execution files in a distributed manner through a network, a gateway to be connected to the network and Internet, and a cloud server to be connected to the Internet, comprising:

receiving application attached information indicating each of the plurality of execution file s and a condition for executing each of the plurality of execution files, from the cloud server;

storing the application attached information;

assigning, to one of the plurality of information processing devices, execution responsibility for an execution file which satisfies the condition and is included in the plurality of execution files;

generating first execution responsibility assignment information that indicates each of the execution files and an information processing device to which the execution responsibility for each of the execution files is assigned when the information processing device functions as a master device in the plurality of information processing devices;

sending the first execution responsibility assignment information to the network; and obtaining the first execution responsibility assignment information when the information processing device functions as the master device or second execution responsibility assignment information from another information processing device in the plurality of information processing devices when the information processing device functions as a slave device in the plurality of information processing devices, the second execution responsibility assignment information being generated by the another information processing device and indicating each of the execution files and an information processing device to which the execution responsibility for each of the execution files is assigned;

referring to the first execution responsibility assignment information or the second execution responsibility assignment information to obtain an execution file whose execution responsibility is assigned to its own device out of the plurality of execution files, from the cloud server via the gateway;

storing the obtained execution file;

referring to the first execution responsibility assignment information or the second execution responsibility assignment information and executing the obtained execution file; and detecting whether one information processing device included in the plurality of information processing devices is newly connected to the network; wherein, the condition is a number of devices required for executing an execution file, it is judged that the condition is satisfied when a number of one or more information processing devices that are included in the plurality of information processing devices and connected to the network is larger than or equal to the number of the devices of the condition, wherein the judgement of the condition is satisfied comprising determining the condition is greater than one to assign the obtained execution file to only one single information processing device; and when it is detected that the one information processing device is newly connected to the network, the information processing method further comprises assigning again the execution responsibility for each of the plurality of execution files to one of the plurality of information processing devices.

* * * * *